United States Patent
Kanda et al.

(10) Patent No.: US 10,196,540 B2
(45) Date of Patent: *Feb. 5, 2019

(54) AQUEOUS COATING COMPOSITION

(71) Applicant: KANSAI PAINT CO., LTD., Hyogo (JP)

(72) Inventors: Takashi Kanda, Kanagawa (JP); Masato Nakamizu, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 269 days.

This patent is subject to a terminal disclaimer.

(21) Appl. No.: 15/111,939

(22) PCT Filed: Dec. 12, 2014

(86) PCT No.: PCT/JP2014/083000
§ 371 (c)(1),
(2) Date: Jul. 15, 2016

(87) PCT Pub. No.: WO2015/114963
PCT Pub. Date: Aug. 6, 2015

(65) Prior Publication Data
US 2016/0333219 A1 Nov. 17, 2016

(30) Foreign Application Priority Data
Jan. 29, 2014 (JP) ................................. 2014-013927

(51) Int. Cl.
| | | |
|---|---|---|
| C09D 175/04 | (2006.01) | |
| C08G 18/62 | (2006.01) | |
| C08G 18/67 | (2006.01) | |
| C09D 5/02 | (2006.01) | |
| C09D 133/06 | (2006.01) | |

(52) U.S. Cl.
CPC ....... *C09D 175/04* (2013.01); *C08G 18/6229* (2013.01); *C08G 18/672* (2013.01); *C09D 5/027* (2013.01); *C09D 133/06* (2013.01)

(58) Field of Classification Search
CPC .... C09D 175/04; C09D 133/06; C09D 5/027; C08G 18/6229; C08G 18/672
See application file for complete search history.

(56) References Cited

FOREIGN PATENT DOCUMENTS

| | | | | |
|---|---|---|---|---|
| EP | 2 835 404 | 2/2015 | | |
| EP | 3 088 433 | 11/2016 | | |
| JP | 2004-224907 | 8/2004 | | |
| JP | 2005-120304 | 5/2005 | | |
| JP | 2006-56973 | 3/2006 | | |
| JP | 2010-150519 | 7/2010 | | |
| JP | 2011-16957 | 1/2011 | | |
| JP | 2011-149011 | 8/2011 | | |
| JP | 2012-62445 | 3/2012 | | |
| JP | 2012-131092 | 7/2012 | | |
| JP | 2013213151 | * 10/2013 | ............... | B05D 1/36 |
| WO | 2013/151050 | 10/2013 | | |

OTHER PUBLICATIONS

Hirose et al; Progress in Organic Coatings, 1997, vol. 31, p. 157-169.*
Hirose et al; Progress in Organic Coatings, 2000, vol. 38, p. 27-34.*
Dong et al; Journal of Colloid and Interface Science, 1999, vol. 214, p. 118-122.*
Brown et al; Progress in Organic Coatings, 2005, vol. 52, p. 73-84.*
International Search Report dated Mar. 17, 2015 in corresponding International (PCT) Application No. PCT/JP2014/083000.
Extended European Search Report dated Jul. 27, 2017 in European Application No. 14880542.7.

* cited by examiner

*Primary Examiner* — Robert S Jones
(74) *Attorney, Agent, or Firm* — Wenderoth, Lind & Ponack, L.L.P.

(57) ABSTRACT

An object of the present invention is to provide an aqueous coating composition comprising acrylic urethane composite resin particles that is excellent in storage stability and compatibility with other resin components and that achieves excellent performance of the obtained coating film, such as in finished appearance and water resistance.

Provided as a means for achieving the above object is an aqueous coating composition comprising acrylic urethane composite resin particles (A), a reactive group-containing resin (B), and optionally a crosslinking agent (C), the acrylic urethane composite resin particles (A) comprising an acrylic urethane resin (I) and a graft acrylic resin (II), and being acrylic urethane composite resin particles prepared by synthesizing the acrylic urethane resin (I) in the presence of the graft acrylic resin (II), the graft acrylic resin (II) being a hydrophobic-chain- and hydrophilic-chain-containing resin having a weight average molecular weight of 5,000 or more.

7 Claims, No Drawings

AQUEOUS COATING COMPOSITION

CROSS REFERENCE TO RELATED APPLICATIONS

This application claims priority to Japanese Patent Application No. 2014-013927, filed on Jan. 29, 2014, the entire contents of which are incorporated by reference herein.

TECHNICAL FIELD

The present invention relates to an aqueous coating composition comprising acrylic urethane composite resin particles that allows for excellent finished appearance and has excellent storage stability, and to a method for producing the aqueous coating composition.

BACKGROUND ART

Urethane resin particles, which have excellent physical properties, have been widely used as resin particles for use in coating compositions, for example, to improve coating film performance.

Acrylic urethane composite resin particles have also been used in the fields such as coating compositions, for example, to obtain the synergistic effects of acryl and urethane, improve compatibility when applied to acrylic resin-based coating compositions, and reduce the cost of urethane resin particles.

Based on the manner of dispersion in aqueous systems, synthesis of acrylic urethane composite resin particles can be roughly categorized into (i) self-emulsifying particles and (ii) particles dispersed using an emulsifier.

As an example of the self-emulsifying particles, Patent Literature 1 discloses a method for producing an aqueous dispersion of a urethane-acrylic inner particle mixture with excellent film-forming properties and water resistance, wherein seed polymerization of an acrylic monomer is performed using, as a seed, an aqueous dispersion of urethane that can be prepared without using an emulsifier, and seed polymerization of an acrylic monomer is then performed again using the obtained aqueous dispersion of an inner particle mixture of urethane and acryl as a seed. Patent Literature 1 discloses that the aqueous dispersion of a urethane-acrylic inner particle mixture can be used for film-forming materials, coating compositions, adhesives, or pressure sensitive adhesives.

However, when such self-emulsifying acrylic urethane composite resin particles are used for an aqueous coating composition, the compatibility with other resin components is insufficient, and the obtained coating film may be cloudy, resulting in unsatisfactory finished appearance. Further, there may be a problem with the storage stability of the aqueous coating composition because of insufficient dispersion stability.

As an example of the particles dispersed using an emulsifier, Patent Literature 2 discloses a method for producing an aqueous dispersion of a (meth)acrylic composite resin by sequentially or continuously adding starting-material emulsions to an aqueous medium in which the emulsions have one or more (meth)acrylic monomers dispersed beforehand, to perform emulsion polymerization of the one or more (meth)acrylic monomers in the presence of a urethane resin. Patent Literature 2 discloses a fiber composite, fibrous base material laminate, and the like obtained using the aqueous dispersion of a (meth)acrylic composite resin.

However, likewise, when such acrylic urethane composite resin particles dispersed using an emulsifier are used for an aqueous coating composition, the compatibility with other resin components is insufficient, and the obtained coating film may be cloudy, resulting in unsatisfactory finished appearance. Further, since such acrylic urethane composite resin particles require a substantial amount of an emulsifier, there may be a problem with the resistance to water load (e.g., water resistance) of the obtained coating film when the particles are used for a coating composition.

Patent Literature 3 discloses an aqueous dispersion of a polyurethane-(meth)acrylic polymer composite resin obtained by dispersing polyurethane and a (meth)acrylic polymer in an aqueous medium, wherein constitutional units derived from the diols constituting the polyurethane and/or constitutional units derived from the polyvalent isocyanates constituting the polyurethane contain a cyclohexane ring, the cyclohexane ring content is 2.5 mol or more per kg of polyurethane, and the (meth)acrylic polymer has a glass transition temperature (Tg) of 50 to 160° C. Patent Literature 3 discloses that an aqueous coating agent and the like containing the composite resin dispersion are excellent in, for example, adhesion to resin substrates such as ABS and metal substrates such as aluminum.

However, likewise, when such an aqueous dispersion of a polyurethane-(meth)acrylic polymer composite resin is used for an aqueous coating composition, since the compatibility of the aqueous dispersion of a polyurethane-(meth)acrylic polymer composite resin with other resin components is insufficient, the obtained coating film may have unsatisfactory finished appearance. Further, there may be a problem with the storage stability of the aqueous coating composition because of insufficient dispersion stability of the aqueous dispersion of a polyurethane-(meth)acrylic polymer composite resin.

CITATION LIST

Patent Literature

PTL 1: JP2005-120304A
PTL 2: JP2011-149011A
PTL 3: JP2010-150519A

SUMMARY OF INVENTION

Technical Problem

An object of the present invention is to provide an aqueous coating composition comprising acrylic urethane composite resin particles that is excellent in storage stability and compatibility with other resin components and that achieves excellent performance of the obtained coating film, such as in finished appearance and water resistance.

Solution to Problem

The present inventors conducted extensive research to achieve the above object and found that it is achieved by acrylic urethane composite resin particles obtained through synthesis in the presence of a graft acrylic resin used as a dispersion stabilizer, the graft acrylic resin being a hydrophobic-chain- and hydrophilic-chain-containing resin having a weight average molecular weight of 5,000 or more. The present invention has been accomplished based on this finding.

Specifically, the present invention includes the following:

Item 1. An aqueous coating composition comprising acrylic urethane composite resin particles (A), a reactive group-containing resin (B), and optionally a crosslinking agent (C), the acrylic urethane composite resin particles (A) comprising an acrylic urethane resin (I) and a graft acrylic resin (II), and being acrylic urethane composite resin particles prepared by synthesizing the acrylic urethane resin (I) in the presence of the graft acrylic resin (II), the graft acrylic resin (II) being a hydrophobic-chain- and hydrophilic-chain-containing resin having a weight average molecular weight of 5,000 or more.

Item 2. The aqueous coating composition according to Item 1, wherein the acrylic urethane resin (I) in the acrylic urethane composite resin particles (A) is an acrylic urethane graft resin (I-A).

Item 3. The aqueous coating composition according to Item 1 or 2, wherein the acrylic resin of the acrylic urethane resin (I) in the acrylic urethane composite resin particles (A) comprises a polymerizable unsaturated monomer having active hydrogen atom(s) reactive with an isocyanate group and other polymerizable unsaturated monomer(s) as constituent monomer components.

Item 4. The aqueous coating composition according to any one of Items 1 to 3, wherein the reactive group of the reactive group-containing resin (B) is at least one member selected from the group consisting of hydroxy, acid group, carbonyl, N-methylol alkyl ether group, isocyanate, epoxy, amino, alkoxysilyl, carbodiimide group, and hydrazide group.

Item 5. An article coated with the aqueous coating composition according to any one of Items 1 to 4.

Item 6. A method for forming a coating film, the method comprising applying the aqueous coating composition according to any one of Items 1 to 4.

Item 7. A method for producing an aqueous coating composition comprising acrylic urethane composite resin particles (A), a reactive group-containing resin (B), and optionally a crosslinking agent (C), the method comprising the following step;

producing the acrylic urethane composite resin particles, the acrylic urethane composite resin particles comprising an acrylic urethane resin (I) and a graft acrylic resin (II), the acrylic urethane resin (I) being synthesized in an aqueous medium in the presence of the graft acrylic resin (II), the graft acrylic resin (II) being a hydrophobic-chain- and hydrophilic-chain-containing resin having a weight average molecular weight of 5,000 or more.

Advantageous Effects of Invention

The aqueous coating composition of the present invention is mainly characterized in that the composition comprises acrylic urethane composite resin particles having a form in which an acrylic urethane resin is dispersed in an aqueous medium, using a hydrophobic-chain- and hydrophilic-chain-containing graft acrylic resin as a dispersion stabilizer.

In the acrylic urethane composite resin particles, the acrylic urethane resin is dispersed in an aqueous medium in a highly stable manner by the effect of the graft acrylic resin used as a dispersion stabilizer. Thus, the acrylic urethane composite resin particles have extremely excellent dispersion stability and storage stability compared with conventional acrylic urethane composite resin particles.

Regarding the acrylic resin of the composite resin particles, the acrylic resin portion of the acrylic urethane resin and the graft acrylic resin, which is a dispersion stabilizer, are separated, thus enabling division of functions. This expands the options for the composition, molecular weight, etc., of all the composite resin particles, including not only those of the acrylic resin portion, but also those of the urethane resin portion, compared with conventional acrylic urethane composite resin particles; therefore, the acrylic urethane composite resin particles of the present invention have a very high degree of flexibility in design.

Accordingly, the compatibility with resins such as other acrylic resins is good compared with conventional acrylic urethane composite resin particles; therefore, an aqueous coating composition that is excellent in storage stability and achieves excellent performance of the obtained coating film, such as in finished appearance and water resistance, can be obtained.

DESCRIPTION OF EMBODIMENTS

The aqueous coating composition of the present invention is described in more detail below.

The aqueous coating composition of the present invention (hereinafter, sometimes simply referred to as "the coating composition of the present invention") comprises acrylic urethane composite resin particles (A), a reactive group-containing resin (B), and optionally a crosslinking agent (C), the acrylic urethane composite resin particles (A) comprising an acrylic urethane resin (I) and a graft acrylic resin (II), and being acrylic urethane composite resin particles prepared by synthesizing the acrylic urethane resin (I) using the graft acrylic resin (II) as a dispersion stabilizer, the graft acrylic resin (II) being a hydrophobic-chain- and hydrophilic-chain-containing resin having a weight average molecular weight of 5,000 or more.

Acrylic Urethane Composite Resin Particles (A)

The acrylic urethane composite resin particles (A) mainly comprise an acrylic urethane resin (I), which is the main portion, and a graft acrylic resin (II), which is a dispersion stabilizer.

The form of the acrylic urethane composite resin particles is not particularly limited as long as the particles are dispersed in water. For example, it is preferable that the acrylic urethane composite resin particles be dispersed in water as particles having a structure in which the graft acrylic resin (II), which is a dispersion stabilizer, is positioned around the acrylic urethane resin (I). In other words, preferably, the acrylic urethane composite resin particles are dispersed in water as micelles having a core shell structure in which the graft acrylic resin (II) is present outside and the acrylic urethane resin (I) is present inside. The acrylic urethane composite resin particles are believed to almost have such a particle form.

More specifically, the core shell structure refers to a structure in which components having different resin compositions are present in the same micelle and in which the resin composition of the central portion (core) differs from that of the outer shell portion (shell).

The core shell structure generally takes a layered structure such that the core portion is completely covered by the shell portion. However, depending on the mass ratio of the core portion to shell portion or other conditions, the shell portion may be insufficient for forming a layered structure. In that case, a complete layered structure as described above is not necessary. A structure in which the shell portion partially covers the core portion may be selected.

The acrylic urethane resin (I) and graft acrylic resin (II) are preferably present in the acrylic urethane composite resin particles at an acrylic urethane resin (I):graft acrylic resin (II) ratio ranging from 20:80 to 95:5 (mass ratio), more preferably from 40:60 to 90:10, and even more preferably from 60:40 to 80:20.

A mass % of the acrylic urethane resin (I) in the composite resin particles of less than 20 may result in reduced properties of the urethane resin since the proportion of the urethane resin is small. A mass % of the acrylic urethane resin (I) of more than 95 may result in reduced dispersibility of the composite resin particles since the amount of the dispersion stabilizer is small.

Acrylic Urethane Resin (I)

The acrylic urethane resin (I) mainly comprises an acrylic resin component and a urethane resin component. The acrylic urethane resin (I) primarily refers to an acrylic urethane resin in which an acrylic resin component and a urethane resin component are chemically bonded to each other. The acrylic urethane resin can also be referred to as a copolymer of acrylic resin and urethane resin. In addition, the "acrylic resin component" and "urethane resin component" can also be referred to as the "acrylic resin portion" and "urethane resin portion," respectively, since each of the components constitutes a portion of the acrylic urethane resin (I).

Acrylic Resin Component

The acrylic resin component of the acrylic urethane resin (I) can be synthesized by copolymerizing polymerizable unsaturated monomers as constituent monomer components according to a usual method.

As used herein, "polymerizable unsaturated monomer" primarily refers to a polymerizable-unsaturated-group-containing compound. A "polymerizable unsaturated group" means an unsaturated group that can undergo radical polymerization. Specific examples of such polymerizable unsaturated groups include acryloyl groups, methacryloyl groups, vinyl groups, allyl groups, propenyl groups, isopropenyl groups, maleimide groups, vinyl ether groups, and the like. Of these polymerizable unsaturated groups, acryloyl groups and methacryloyl groups are preferable, and acryloyl groups are particularly preferable, in view of excellent reactivity.

Examples of polymerizable unsaturated monomers include alkyl or cycloalkyl (meth)acrylates, such as methyl (meth)acrylate, ethyl (meth)acrylate, n-propyl (meth)acrylate, iso-propyl (meth)acrylate, n-butyl (meth)acrylate, isobutyl (meth)acrylate, tert-butyl (meth)acrylate, pentyl (meth)acrylate, hexyl (meth)acrylate, octyl (meth)acrylate, 2-ethylhexyl (meth)acrylate, nonyl (meth)acrylate, tridecyl (meth)acrylate, lauryl (meth)acrylate, stearyl (meth)acrylate, isostearyl (meth)acrylate, cyclohexyl (meth)acrylate, methylcyclohexyl (meth)acrylate, t-butylcyclohexyl (meth)acrylate, cyclododecyl (meth)acrylate, isobornyl (meth)acrylate, adamantyl (meth)acrylate, and tricyclodecanyl (meth)acrylate;

polymerizable unsaturated monomers having at least two polymerizable unsaturated groups per molecule, such as allyl (meth)acrylate, ethylene glycol di(meth)acrylate, triethylene glycol di(meth)acrylate, tetraethylene glycol di(meth)acrylate, 1,3-butylene glycol di(meth)acrylate, trimethylol propane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tetra(meth)acrylate, glycerol di(meth)acrylate, 1,1,1-trishydroxymethylethane di(meth)acrylate, 1,1,1-trishydroxymethylethane tri(meth)acrylate, 1,1,1-trishydroxymethylpropane tri(meth)acrylate, triallyl isocyanurate, diallyl terephthalate, divinylbenzene, methylenebisacrylamide, and ethylenebisacrylamide;

aromatic ring-containing polymerizable unsaturated monomers, such as benzyl (meth)acrylate, styrene, α-methylstyrene, and vinyltoluene;

alkoxysilyl-containing polymerizable unsaturated monomers, such as vinyltrimethoxysilane, vinyltriethoxysilane, vinyltris(2-methoxyethoxy)silane, γ-(meth)acryloyloxypropyltrimethoxysilane, and γ-(meth)acryloyloxypropyltriethoxysilane;

perfluoroalkyl (meth)acrylates, such as perfluorobutylethyl (meth)acrylate and perfluorooctylethyl (meth)acrylate;

fluorinated alkyl-containing polymerizable unsaturated monomers, such as fluoroolefin;

polymerizable unsaturated monomers having photopolymerizable functional groups, such as maleimide;

vinyl compounds, such as N-vinylpyrrolidone, ethylene, butadiene, chloroprene, vinyl propionate, and vinyl acetate;

nitrogen-containing polymerizable unsaturated monomers, such as (meth)acrylonitrile, (meth)acrylamide, N,N-dimethylaminoethyl (meth)acrylate, N,N-diethylaminoethyl (meth)acrylate, N,N-dimethylaminopropyl (meth)acrylamide, and adducts of glycidyl (meth)acrylate with amines;

epoxy-containing polymerizable unsaturated monomers, such as glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate, and allyl glycidyl ether;

(meth)acrylates having alkoxy-terminated polyoxyethylene chains;

carbonyl-containing polymerizable unsaturated monomers, such as acrolein, diacetone acrylamide, diacetone methacrylamide, acetoacetoxyethyl methacrylate, formylstyrol, and vinyl alkyl ketones having 4 to 7 carbon atoms (e.g., vinyl methyl ketone, vinyl ethyl ketone, and vinyl butyl ketone);

hydroxy-containing polymerizable unsaturated monomers, such as monoesterified products of (meth)acrylic acid with a dihydric alcohol having 2 to 8 carbon atoms (e.g., 2-hydroxyethyl (meth)acrylate, 2-hydroxypropyl (meth)acrylate, 3-hydroxypropyl (meth)acrylate, and 4-hydroxybutyl (meth)acrylate); ε-caprolactone-modified products of the monoesterified products of (meth)acrylic acid with a dihydric alcohol having 2 to 8 carbon atoms; N-hydroxymethyl (meth)acrylamide; allyl alcohol; and (meth)acrylates having hydroxy-terminated polyoxyethylene chains; amino-containing polymerizable unsaturated monomers, such as 1-aminoethyl (meth)acrylate, 1-aminopropyl (meth)acrylate, allylamine, and p-vinylaniline;

carboxy-containing polymerizable unsaturated monomers, such as (meth)acrylic acid, maleic acid, crotonic acid, and β-carboxyethyl acrylate; and the like.

Preferred among the alkyl or cycloalkyl (meth)acrylates described above are n-butyl (meth)acrylate and 2-ethylhexyl (meth)acrylate.

Preferred among the polymerizable unsaturated monomers having at least two polymerizable unsaturated groups per molecule are allyl (meth)acrylate, ethylene glycol di(meth)acrylate, 1,4-butanediol di(meth)acrylate, neopentyl glycol di(meth)acrylate, and 1,6-hexanediol di(meth)acrylate.

The acrylic resin component of the acrylic urethane resin (I) preferably comprises a polymerizable unsaturated monomer having at least two polymerizable unsaturated groups per molecule as a constituent monomer component of the acrylic resin component of the acrylic urethane resin (I), in view of the dispersion stability of the obtained acrylic urethane composite resin particles, the storage stability of the aqueous coating composition of the present invention, and the performance of the obtained coating film, such as water resistance.

When a polymerizable unsaturated monomer having at least two polymerizable unsaturated groups per molecule is used, it is suitable that the amount of the polymerizable unsaturated monomer having at least two polymerizable unsaturated groups per molecule is in the range of 0.1 to 20 mass %, preferably 1 to 15 mass %, and more preferably 3 to 20 mass %, in the constituent monomer components of the acrylic resin component of the acrylic urethane resin (I).

Preferred among the hydroxy-containing polymerizable unsaturated monomers described above are 2-hydroxyethyl (meth)acrylate, 2-hydroxypropyl (meth)acrylate, 3-hydroxypropyl (meth)acrylate, and 4-hydroxybutyl (meth)acrylate.

Preferred among the amino-containing polymerizable unsaturated monomers described above are 1-aminoethyl (meth)acrylate and 1-aminopropyl (meth)acrylate.

In the present specification, the term "(meth)acrylic acid" means acrylic acid or methacrylic acid. The term "(meth)acrylate" means acrylate or methacrylate. The term "(meth)acryloyl" means acryloyl or methacryloyl. The term "(meth)acrylamide" means acrylamide or methacrylamide.

These monomers can be used singly or in a combination of two or more.

In view of, for example, the dispersion stability of the acrylic urethane composite resin particles and the performance of the obtained coating film, the acrylic urethane resin (I) is preferably an acrylic urethane resin in which the acrylic resin component and urethane resin component of the acrylic urethane resin (I) are chemically bonded to each other (hereinafter, this acrylic urethane resin may be referred to as the "acrylic urethane graft resin (I-A)").

The acrylic resin component and the urethane resin component can be grafted (bonded) together by, for example, performing synthesis using a polymerizable unsaturated monomer having active hydrogen atom(s) reactive with an isocyanate group as a constituent monomer component of the acrylic resin component.

In the polymerizable unsaturated monomer containing a group having active hydrogen atom(s) reactive with an isocyanate group, the group having active hydrogen atom(s) reactive with an isocyanate group serves as a group for a grafting reaction between the acrylic resin component and urethane resin component of the acrylic urethane graft resin (I-A). The polymerizable unsaturated monomer (1) containing a group having active hydrogen atom(s) reactive with an isocyanate group encompasses one in which active hydrogen atom(s) reactive with an isocyanate group are reacted with the isocyanate groups of the urethane resin portion before synthesis of the acrylic resin portion.

A group having active hydrogen atom(s) reactive with an isocyanate group that does not undergo a grafting reaction with the acrylic resin component can be used as a crosslinking reactive group.

Examples of the group having active hydrogen atom(s) reactive with an isocyanate group include hydroxy, amino, carboxy, and the like.

Examples of the polymerizable unsaturated monomer containing a group having active hydrogen atom(s) reactive with an isocyanate group include, among the polymerizable unsaturated monomers listed above, hydroxy-containing polymerizable unsaturated monomers, amino-containing polymerizable unsaturated monomers, carboxy-containing polymerizable unsaturated monomers, and the like.

The polymerizable unsaturated monomer containing a group having active hydrogen atom(s) reactive with an isocyanate group is preferably a hydroxy-containing polymerizable unsaturated monomer in view of ease of reaction control.

When the polymerizable unsaturated monomer containing a group having active hydrogen atom(s) reactive with an isocyanate group is used, the proportion of the polymerizable unsaturated monomer containing a group having active hydrogen atom(s) reactive with an isocyanate group is preferably 0.1 to 30 mass %, more preferably 1 to 25 mass %, and even more preferably 5 to 20 mass %, based on the total amount of the constituent monomer components of the acrylic resin component, in view of the stability of the acrylic urethane composite resin particles in an aqueous medium and imparting a crosslinkable functional group.

The polymerization reaction of polymerizable unsaturated groups for the acrylic resin component can be performed by a known radical polymerization reaction. The polymerization initiator may be a water-soluble initiator or an oil-soluble initiator. When an oil-soluble initiator is used under aqueous conditions, the oil-soluble initiator is preferably added before forming an aqueous dispersion.

Although the appropriate amount of the polymerization initiator varies depending on the type of the polymerization initiator, it is generally preferable that the polymerization initiator be used within the range of 0.05 to 5 mass %, based on the total amount of the polymerizable unsaturated monomers.

Examples of polymerization initiators include azo compounds, such as azobisisobutyronitrile, azobis(2,4-dimethylvaleronitrile), azobis(2-methylpropionenitrile), azobis(2-methylbutyronitrile), 4,4'-azobis(4-cyanobutanoic acid), dimethyl azobis(2-methylpropionate), azobis[2-methyl-N-(2-hydroxyethyl)-propionamide], azobis{2-methyl-N-[2-(1-hydroxybutyl)]-propionamide}, and 2,2'-azobis[N-(2-carboxyethyl)-2-methylpropionamide]; organic peroxides, such as benzoyl peroxide, octanoyl peroxide, lauroyl peroxide, stearoyl peroxide, cumene hydroperoxide, tert-butyl peroxide, tert-butylperoxy laurate, tert-butylperoxyisopropyl carbonate, tert-butylperoxy acetate, and diisopropylbenzene hydroperoxide; and inorganic peroxides, such as potassium persulfate, ammonium persulfate, sodium persulfate, and like persulfates.

These polymerization initiators can be used singly or in a combination of two or more.

An organic or inorganic peroxide can be used in combination with a reducing agent in the form of a redox initiator. Examples of reducing agents include L-ascorbic acid, L-sorbic acid, sodium metabisulfite, ferric sulfate, ferric chloride, rongalite, and the like.

The polymerization can be performed at a temperature of about 20 to 100° C. When a redox initiator is used in a redox system, the polymerization can be performed at a temperature of about 75° C. or less.

The method for adding the polymerization initiator is not particularly limited, and can be suitably selected according to the type and amount of the polymerization initiator. For example, the polymerization initiator may be incorporated beforehand into the monomer mixture or aqueous medium, or added at one time or dropwise at the time of polymerization. Any of the following methods can be used: a method of adding the initiator at one time at the beginning of the polymerization, a method of adding the initiator dropwise over time, or a method comprising incorporating a part of the initiator at the beginning of the polymerization, and then adding the rest of the initiator.

In view of sufficiently performing the polymerization reaction and reducing the residual monomers, it is also possible to add a polymerization initiator during the polymerization reaction or after the polymerization, and further conduct a polymerization reaction. In this case, any combination of polymerization initiators can be selected.

Generally, the amount of the polymerization initiator added is preferably about 0.1 to 5 mass %, and more preferably about 0.2 to 3 mass %, based on the total mass of the monomers used.

In the polymerization of the polymerizable unsaturated monomers, a known chain transfer agent can be used to adjust the molecular weight. Examples of chain transfer agents include mercapto-containing compounds. Specific examples include lauryl mercaptan, t-dodecyl mercaptan, octylmercaptan, 2-ethylhexyl thioglycolate, 2-methyl-5-tert-butylthiophenol, mercaptoethanol, thioglycerol, mercaptoacetic acid (thioglycolic acid), mercaptopropionate, n-octyl-3-mercaptopropionate, and the like.

When a chain transfer agent is used, it is generally preferable that the amount of the chain transfer agent be in the range of 0.05 to 10 mass %, and particularly preferably 0.1 to 5 mass %, based on the total amount of the polymerizable unsaturated monomers used.

The polymerization reaction is generally performed for about 1 to 12 hours.

In view of the storage stability of the coating composition and the performance of the obtained coating film, the acrylic resin component of the acrylic urethane resin (I) preferably has a hydroxy value of 1 to 150 mg KOH/g, more preferably 2 to 120 mg KOH/g, and even more preferably 5 to 100 mg KOH/g.

Moreover, in view of polymerization stability, the acrylic resin component of the acrylic urethane resin (I) preferably has an acid value of substantially 0.

Further, in view of the performance of the coating film obtained when the composite resin particles are used for a coating composition, the acrylic resin component of the acrylic urethane resin (I) has a glass transition temperature of −60 to 60° C., particularly preferably −60 to 40° C., and further particularly preferably −60 to 20° C.

In the present specification, the glass transition temperature Tg (absolute temperature) of the acrylic resin refers to a value calculated according to the following equation.

$$1/Tg = W_1/T_1 + W_2/T_2 + \ldots W_n/T_n$$

(wherein $W_1, W_2, \ldots W_n$ are mass fractions of the respective monomers; and $T_1, T_2 \ldots T_n$ are glass transition temperatures (absolute temperatures) of homopolymers of the respective monomers)

The glass transition temperatures of homopolymers of the respective monomers are values shown in the "Polymer Handbook" Fourth Edition, edited by J. Brandrup, E. H. Immergut, and E. A. Grulke, 1999. When the glass transition temperature of a monomer was not shown in the Handbook, a homopolymer of the monomer having a weight average molecular weight of about 50,000 was synthesized, and the glass transition temperature of the homopolymer was determined by differential scanning thermal analysis.

Urethane Resin Component

The urethane resin component of the acrylic urethane resin (I) can be synthesized, for example, by using an organic polyisocyanate compound, a polyol, and optionally a compound containing both an active hydrogen group and an ion-forming group.

Examples of the organic polyisocyanate compound include isophorone diisocyanate (IPDI), 2,4-tolylene diisocyanate (2,4-TDI) and a mixture thereof with 2,6-tolylene diisocyanate (2,6-TDI), 4 4'-diphenylmethane diisocyanate, 1,4-phenylene diisocyanate, 1,5-naphthalene diisocyanate, hexamethylene diisocyanate (HMDI), trimethylhexamethylene diisocyanate, cyclohexane-1,4-diisocyanate, 4,4'-dicyclohexylmethane diisocyanate (hydrogenated MDI), xylylene diisocyanate, tetramethylxylylene diisocyanate, and the like. If necessary, trimers of the above TDI, HMDI, IPDI, etc., or trivalent polyisocyanates that are reactants with trimethylolpropane or the like can also be used.

Examples of the polyol include the following compounds.

Diol compounds: ethylene glycol, propylene glycol, diethylene glycol, triethylene glycol, 1,2-butylene glycol, 1,3-butylene glycol, 2,3-butylene glycol, 1,4-butylene glycol, 1,5-pentanediol, neopentyl glycol, 1,6-hexane glycol, 2,5-hexanediol, dipropylene glycol, 2,2,4-trimethyl-1,3-pentanediol, tricyclodecanedimethanol, 1,4-cyclohexanedimethanol, and the like.

Polyetherdiols: alkylene oxide addition products of the diol compounds described above, ring-opening (co)polymers of alkylene oxides and cyclic ethers (tetrahydrofuran and the like), such as polyethylene glycol, polypropylene glycol, (blocked or random) copolymers of ethylene glycol and propylene glycol, glycol, polytetramethylene glycol, polyhexamethylene glycol, polyoctamethylene glycol, and the like.

Polyester diols: compounds obtained by polycondensing dicarboxylic acids (or dicarboxylic acid anhydrides), such as adipic acid, succinic acid, sebacic acid, glutaric acid, maleic acid, fumaric acid, and phthalic acid, with diol compounds described above, such as ethylene glycol, propylene glycol, 1,4-butanediol, 1,6-hexanediol, 1,8-octamethylenediol, and neopentyl glycol, under conditions such that hydroxy groups are present in excess. Specific examples include ethylene glycol-adipic acid condensation products, butanediol-adipic acid condensation products, hexamethylene glycol-adipic acid condensation products, ethylene glycol-propylene glycol-adipic acid condensation products, polylactone diols obtained by subjecting lactone to ring-opening polymerization using glycol as an initiator, and the like.

Polyether ester diols: compounds obtained by adding ether group-containing diols (e.g., the polyether diol and diethylene glycol mentioned above) or mixtures thereof with other glycols to dicarboxylic acids (or dicarboxylic acid anhydrides) as described above as examples of polyester diols and then reacting alkylene oxides therewith, such as polytetramethylene glycol-adipic acid condensation products.

Polycarbonate diols: compounds represented by the formula HO—R—(O—C(O)—O—R)$_x$—OH (wherein R represents a $C_{1-12}$ saturated fatty acid diol residue, and x represents the number of repetitive units in the molecule and is usually an integer of 5 to 50), and the like. These compounds can be obtained, for example, by a transesterification method in which a saturated aliphatic diol is reacted with a substituted carbonate (diethyl carbonate, diphenyl carbonate, etc.) under conditions such that hydroxy groups are present in excess, and a method in which the saturated aliphatic diol described above is reacted with a phosgene, or the reaction product is then further reacted, if necessary, with the saturated aliphatic diol.

In view of, for example, the performance of the obtained coating film, it is preferable to mainly use a polyol component containing a polycarbonate diol as the polyol component.

In view of, for example, water dispersibility, the polyol preferably has a number average molecular weight of 300 to 3,000, and more preferably 500 to 2,500.

When a polycarbonate diol is used for the polyol component, the proportion of the polycarbonate diol is preferably in the range of 10 to 100 mass %, particularly preferably 30 to 98 mass %, and further particularly preferably 50 to 95 mass %, based on the total amount of the polyol component.

Examples of the compound containing both an active hydrogen group and an ion-forming group include compounds containing at least two hydroxy groups and at least one carboxy group per molecule, compounds containing at least two hydroxy groups and at least one sulfonic acid group per molecule, and the like. This compound acts as an ion-forming group in the urethane resin. To improve the dispersion stability of the acrylic urethane composite resin particles, this compound can be suitably used.

Examples of carboxy-containing compounds include alkanol carboxylic acids, such as dimethylol propionic acid, dimethylol acetic acid, dimethylol butanoic acid, dimethylol heptanoic acid, dimethylolnonanoic acid, 1-carboxy-1,5-pentylenediamine, dihydroxybenzoic acid, and 3,5-diaminobenzoic acid; half-ester compounds of polyoxypropylene triol with maleic anhydride or phthalic anhydride; and the like.

Examples of sulfonic acid group-containing compounds include 2-sulfonic acid-1,4-butanediol, 5-sulfonic acid-di-β-hydroxyethyl isophthalate, N,N-bis(2-hydroxyethyl)aminoethylsulfonic acid, and the like.

When the compound containing both an active hydrogen group and an ion-forming group is used, the amount of the compound containing both an active hydrogen group and an ion-forming group is preferably 0 to 20 mass %, and more preferably 5 to 10 mass %, based on the total amount of the compounds constituting the urethane resin component.

When a carboxy- or sulfonic-acid-group-containing compound is used as the compound containing both an active hydrogen group and an ion-forming group, a neutralizer can be used to form a salt and hydrophilize the compound. Examples of neutralizers include amines, such as trimethylamine, triethylamine, monoethanolamine, diethanolamine, triethanolamine, triethylenediamine, and dimethylaminoethanol; and alkali metal compounds, such as sodium hydroxide and potassium hydroxide.

The percent neutralization of carboxy or sulfonic acid groups can generally be 50 to 100 mol %. The neutralizer is preferably dimethylaminoethanol in view of dispersibility.

The grafting reaction between the acrylic resin component and urethane resin component in the acrylic urethane graft resin (I-A) can be conducted by, for example, reacting the group having active hydrogen atom(s) reactive with an isocyanate group of the polymerizable unsaturated monomer having active hydrogen atom(s) reactive with an isocyanate group, which is a constituent component of the acrylic resin component, as a grafting reaction group. In this case, the urethane resin component is synthesized under conditions in which isocyanate groups are present in excess so that isocyanate groups remain.

The molar ratio of NCO groups of the organic polyisocyanate compound to active hydrogen groups of the polyol and the compound containing both an active hydrogen group and an ion-forming group is preferably within the range of 1.01:1 to 3.0:1, and particularly preferably 1.05:1 to 2.0:1.0.

The urethane resin component can be synthesized by reacting the organic polyisocyanate compound, the polyol, and optionally the compound containing both an active hydrogen group and an ion-forming group to obtain an isocyanate group-terminated urethane prepolymer, and if necessary, further performing a chain extension reaction.

The prepolymerization reaction is preferably performed at 50 to 120° C. When the prepolymerization reaction is performed in the presence of a polymerizable unsaturated monomer of the acrylic resin component, a polymerization inhibitor, such as p-methoxy phenol, butylhydroxytoluene, or 4-tert-butylcatechol, is preferably added at a concentration of about 20 to 3,000 ppm to the polymerizable unsaturated monomer in the presence of air, to prevent polymerization of the polymerizable unsaturated monomer due to heat.

As a catalyst for the urethanization reaction, for example, an organic tin compound, such as dibutyltin dilaurate, dibutyltin dioctoate, or stannous octoate, or a tertiary amine compound, such as triethylamine or triethylenediamine, can be used as desired.

The grafting reaction between the acrylic resin component and urethane resin component of the acrylic urethane graft resin (I-A) can be performed by a known method without limitation. In view of the stability of polymerization reaction, the grafting reaction is preferably performed by reacting the group having active hydrogen atom(s) reactive with an isocyanate group in the polymerizable unsaturated monomer having active hydrogen atom(s) reactive with an isocyanate group, with the isocyanate groups of the urethane resin component synthesized under conditions in which isocyanate groups are present in excess, to introduce the polymerizable unsaturated groups into the urethane resin component, and reacting the urethane resin component in which the polymerizable unsaturated groups are introduced with the polymerizable unsaturated monomer to conduct a polymerization reaction of the polymerizable unsaturated groups and complete the reaction.

The polymerization reaction is generally performed for about 1 to 12 hours.

In the acrylic urethane resin (I), if necessary, a portion or all of the isocyanate groups of the urethane prepolymer may be blocked with a blocking agent to yield blocked isocyanate groups.

A blocking agent is used for blocking free isocyanate groups. When blocked polyisocyanate groups are heated at, for example, a temperature of 100° C. or higher, and preferably 130° C. or higher, isocyanate groups are regenerated and can readily react with functional groups, such as hydroxy groups.

Examples of the blocking agent include phenol, cresol, xylenol, nitrophenol, ethylphenol, hydroxydiphenyl, butylphenol, isopropylphenol, nonylphenol, octylphenol, methyl hydroxybenzoate, and like phenol compounds; ε-caprolactam, δ-valerolactam, γ-butyrolactam, β-propiolactam, and like lactam compounds; methanol, ethanol, propyl alcohol, butyl alcohol, amyl alcohol, lauryl alcohol, and like aliphatic alcohol compounds; ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol, and like ether compounds; benzyl alcohol; glycolic acid; methyl glycolate, ethyl glycolate, butyl glycolate, and like glycolates; lactic acid, methyl lactate, ethyl lactate, butyl lactate, and like lactates; methylol urea, methylol melamine, diacetone alcohol, 2-hydroxyethyl acrylate, 2-hydroxyethyl methacrylate, and like alcohol compounds; formamide oxime, acetamide oxime, acetoxime, methyl ethyl ketoxime, diacetyl monoxime, benzophenone oxime, cyclohexane oxime, and like oxime compounds; dimethyl malonate, diethyl malonate, ethyl acetoacetate, methyl acetoacetate, acetylacetone, and like active methylene compounds; butyl mercaptan, t-butyl mercaptan, hexyl mercaptan, t-dodecyl mercaptan, 2-mercaptobenzothiazole, thiophenol, methylthiophenol, ethylthiophenol, and like mercaptan compounds; acetanilide, acetanisidide, acetotoluide, acrylamide, methacrylamide, acetic acid amide, stearic acid amide, benzamide, and like acid amide compounds; succinimide, phthalimide, maleimide, and like imide compounds; diphenylamine, phenylnaphthylamine, xylidine, N-phenylxylidine, carbazole, aniline, naphthylamine, butylamine, dibutylamine, butylphenylamine, and like amines; imidazole, 2-ethylimidazole, and like imidazole compounds; 3,5-dimethylpyrazole and like pyrazole compounds; urea, thiourea, ethylene urea, ethylenethiourea, diphenylurea, and like urea compounds; phenyl N-phenylcarbamate and like carbamate compounds; ethyleneimine, propyleneimine, and like imine compounds; sodium bisulfite, potassium bisulfite, and like sulfite compounds; and the like.

Preferred among these are oxime, lactam and pyrazole blocking agents. In view of imparting low-temperature curability, pyrazole blocking agents are particularly preferable.

In view of dispersibility, manufacturability, and the performance of the coating film obtained when the composite resin particles are used for a coating composition, the urethane resin component of the acrylic urethane resin (I) preferably has a weight average molecular weight of 3,000 to 100,000, and particularly preferably 5,000 to 50,000.

If the weight average molecular weight is less than 3,000, the performance of the coating film obtained when the composite resin particles are used for a coating composition may be low. If the weight average molecular weight exceeds 100,000, dispersibility may be reduced, and/or the viscosity may significantly increase during the production, requiring a large amount of an organic solvent.

Graft Acrylic Resin (II)

The graft acrylic resin (II) is a dispersion stabilizer in the acrylic urethane composite resin particles, and is a graft acrylic resin that has a structure in which a hydrophobic chain component (X) and a hydrophilic chain component (Y) are grafted together. The "hydrophobic chain component (X)" and "hydrophilic chain component (Y)" are also referred to as "hydrophobic portion (X)" and "hydrophilic portion (Y)" since each of the components constitutes a portion of the graft acrylic resin (II).

The graft acrylic resin (II) can be synthesized by, for example, polymerizing polymerizable unsaturated monomer components having different compositions (the hydrophobic chain component (X) and the hydrophilic chain component (Y)) in the presence of an organic solvent in multiple stages.

Of these, the hydrophilic chain component (Y) is synthesized using a hydrophilic group-containing polymerizable unsaturated monomer as an essential component.

The grafting reaction of the hydrophobic chain component (X) with the hydrophilic chain component (Y) can be performed by, for example, incorporating polymerizable unsaturated monomers having functional groups, other than polymerizable unsaturated groups, that are reactive with each other into the component (X) and the component (Y), and allowing the functional groups that are reactive with each other to be reacted with each other.

Examples of combinations of such functional groups that are reactive with each other include a combination of epoxy and carboxy, a combination of hydroxy and isocyanate, condensation of alkoxysilyl groups, and the like.

Among these, a combination of epoxy and carboxy can preferably be used in view of ease of synthesis.

The reaction between the functional groups that are reactive with each other can be performed by suitably setting reaction conditions according to, for example, the combination of the functional groups.

A graft acrylic resin (II) synthesized using the hydrophobic chain component (X) into which an epoxy-containing polymerizable unsaturated monomer is incorporated and the hydrophilic chain component (Y) into which a carboxy-containing polymerizable unsaturated monomer is incorporated (hereinafter this graft acrylic resin is also referred to as the "graft acrylic resin (II-p)") can particularly preferably be used.

In view of the dispersibility of the acrylic urethane composite resin particles, the difference in solubility parameter between the hydrophobic chain component (X) and hydrophilic chain component (Y) of the graft acrylic resin (II) is preferably at least 0.5 or more, and more preferably 1.0 or more.

The solubility parameter (SP value) as used herein is a characteristic value determined by the following equation (1).

$$\text{(Molecular cohesive energy/molecular volume)}^{1/2} \qquad \text{equation (1)}$$

The SP values of the hydrophobic chain component (X) and the hydrophilic chain component (Y) can each be determined. For example, when the hydrophobic chain component (X) and the hydrophilic chain component (Y) are each a copolymer that can be synthesized by polymerizing two or more polymerizable unsaturated monomers as constituent monomer components, each SP value can be determined by the following equation (2).

$$S1 \times \Phi1 + S2 \times \Phi2 \qquad \text{equation (2)}$$

(wherein S1, S2 . . . indicate the solubility parameters of the respective monomers used in the copolymer, and $\Phi1$, $\Phi2$, . . . indicate the volume fractions of the respective monomers of the copolymer)

Graft Acrylic Resin (II-p)

The graft acrylic resin (II-p) can be obtained by synthesizing an acrylic resin in which a hydrophobic chain component (X) and a hydrophilic chain component (Y) are grafted together. The hydrophobic chain component (X) can be synthesized by polymerizing an epoxy-containing polymerizable unsaturated monomer (a1) and other polymerizable unsaturated monomer(s) (a2) as constituent monomer components, and the hydrophilic chain component (Y) can be synthesized by polymerizing a carboxy-containing polymerizable unsaturated monomer (b1) and other polymerizable unsaturated monomer(s) (b2) as constituent monomer components.

Hydrophobic Chain Component (X)

In the hydrophobic chain component (X), the epoxy-containing polymerizable unsaturated monomer (a1) is a monomer used for reacting with the carboxy of the carboxy-containing polymerizable unsaturated monomer, which is a constituent monomer component of the hydrophilic chain component (Y), to graft together the hydrophobic chain component (X) and the hydrophilic chain component (Y). Examples include glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate, allyl glycidyl ether, and the like.

These can be used singly or in a combination of two or more.

Other polymerizable unsaturated monomer(s) (a2) are polymerizable unsaturated monomers other than the monomer (a1) described above. Examples include alkyl or cycloalkyl (meth)acrylates, such as methyl (meth)acrylate, ethyl (meth)acrylate, n-propyl (meth)acrylate, i-propyl (meth)acrylate, n-butyl (meth)acrylate, i-butyl (meth)acrylate, tert-butyl (meth)acrylate, n-hexyl (meth)acrylate, n-octyl (meth)acrylate, 2-ethylhexyl (meth)acrylate, nonyl (meth)acrylate, tridecyl (meth)acrylate, lauryl (meth)acrylate, stearyl (meth)acrylate, Isostearyl Acrylate (trade name, produced by Osaka Organic Chemical Industry, Ltd.), cyclohexyl (meth)acrylate, methylcyclohexyl (meth)acrylate, t-butylcyclohexyl (meth)acrylate, cyclododecyl (meth)acrylate, and tricyclodecanyl (meth)acrylate; isobornyl-containing polymerizable unsaturated monomers, such as isobornyl (meth)acrylate; adamantyl-containing polymerizable unsaturated monomers, such as adamantyl (meth)acrylate; tricyclodecenyl-containing polymerizable unsaturated monomers, such as tricyclodecenyl (meth)acrylate; aromatic ring-containing polymerizable unsaturated monomers, such as benzyl (meth)acrylate, styrene, α-methylstyrene, and vinyltoluene; hydrolyzable silyl-containing polymerizable unsaturated monomers, such as vinyltrimethoxysilane, vinylmethyldimethoxysilane, vinyltriethoxysilane, vinylmethyldiethoxysilane, vinyltris(2-methoxyethoxy)silane, vinyltriisopropoxysilane, γ-(meth)acryloyloxypropyltrimethoxysilane, γ-(meth)acryloyloxypropylmethyldimethoxysilane, γ-(meth)acryloyloxypropyltriethoxysilane, γ-(meth)acryloyloxypropylmethyldiethoxysilane, γ-(meth)acryloyloxypropyltri-n-propoxysilane, γ-(meth)acryloyloxypropyltriisopropoxysilane, vinyltriacetoxysilane, and β-(meth)acryloyloxyethyltrimethoxysilane; perfluoroalkyl (meth)acrylates, such as perfluorobutylethyl (meth)acrylate and perfluorooctylethyl (meth)acrylate; fluorinated alkyl-containing polymerizable unsaturated monomers, such as fluoroolefin; vinyl compounds, such as N-vinylpyrrolidone, ethylene, butadiene, chloroprene, vinyl propionate, and vinyl acetate; phosphoric acid group-containing polymerizable unsaturated monomers such as 2-acryloyloxyethyl acid phosphate, 2-methacryloyloxyethyl acid phosphate, 2-acryloyloxypropyl acid phosphate, and 2-methacryloyloxypropyl acid phosphate; carboxy-containing polymerizable unsaturated monomers, such as (meth)acrylic acid, maleic acid, crotonic acid, and β-carboxyethyl acrylate; nitrogen-containing polymerizable unsaturated monomers, such as (meth)acrylonitrile, (meth)acrylamide, methylenebis(meth)acrylamide, ethylenebis(meth)acrylamide, 2-(methacryloyloxy)ethyltrimethyl ammonium chloride, and adducts of glycidyl (meth)acrylate with amines; polymerizable unsaturated monomers having at least two polymerizable unsaturated groups per molecule, such as allyl (meth)acrylate and 1,6-hexanediol di(meth)acrylate; sulfonic acid group-containing polymerizable unsaturated monomers, such as 2-acrylamide-2-methylpropanesulfonic acid, 2-sulfoethyl (meth)acrylate, allylsulfonic acid, and 4-styrenesulfonic acid; and sodium salts and ammonium salts of these sulfonic acids; acid anhydride group-containing polymerizable unsaturated monomers, such as maleic anhydride, itaconic anhydride, and citraconic anhydride; hydroxy-containing polymerizable unsaturated monomers; and the like. These can be used singly or in a combination of two or more.

Examples of hydroxy-containing polymerizable unsaturated monomers include monoesterified products of (meth)acrylic acid with a dihydric alcohol having 2 to 8 carbon atoms, such as 2-hydroxyethyl(meth)acrylate, 2-hydroxypropyl (meth)acrylate, 3-hydroxypropyl (meth)acrylate, and 4-hydroxybutyl (meth)acrylate; ε-caprolactone-modified products of the monoesterified products of (meth)acrylic acid with a dihydric alcohol having 2 to 8 carbon atoms; allyl alcohol; and the like.

Hydroxy-containing polymerizable unsaturated monomers can be preferably used in view of, for example, improving the water dispersibility of the acrylic urethane composite resin particles and imparting a crosslinkable functional group.

When a hydroxy-containing polymerizable unsaturated monomer is used, the amount of the hydroxy-containing polymerizable unsaturated monomer is 5 mass % or more, preferably 10 mass % or more, and more preferably within the range of 15 to 50 mass % in other polymerizable unsaturated monomer(s) (a2).

Hydrophilic Chain Component (Y)

In the hydrophilic chain component (Y), the carboxy-containing polymerizable unsaturated monomer (b1) is a monomer used for introducing a functional group to be reacted with the epoxy of the epoxy-containing polymerizable unsaturated monomer, which is a constituent monomer component of the hydrophobic chain component (X), to graft together the hydrophobic chain component (X) and the hydrophilic chain component (Y). Further, the carboxy-containing polymerizable unsaturated monomer (b1) is also a hydrophilic group-containing polymerizable unsaturated monomer used for introducing a water-dispersible group into the graft acrylic resin (II).

Specific examples include (meth)acrylic acid, maleic acid, crotonic acid, β-carboxyethyl acrylate, and the like. These can be used singly or in a combination of two or more.

Other polymerizable unsaturated monomer(s) (b2) are polymerizable unsaturated monomers other than the monomer (b1) described above. Examples include alkyl or cycloalkyl (meth)acrylates, such as methyl (meth)acrylate, ethyl (meth)acrylate, n-propyl (meth)acrylate, i-propyl (meth)acrylate, n-butyl (meth)acrylate, i-butyl (meth)acrylate, tert-butyl (meth)acrylate, n-hexyl (meth)acrylate, n-octyl (meth)acrylate, 2-ethylhexyl (meth)acrylate, nonyl (meth)acrylate, tridecyl (meth)acrylate, lauryl (meth)acrylate, stearyl (meth)acrylate, isostearyl (meth)acrylate, cyclohexyl (meth)acrylate, methylcyclohexyl (meth)acrylate, t-butylcyclohexyl (meth)acrylate, cyclododecyl (meth)acrylate, and tricyclodecanyl (meth)acrylate; isobornyl-containing polymerizable unsaturated monomers, such as isobornyl (meth)acrylate; adamantyl-containing polymerizable unsaturated monomers, such as adamantyl (meth)acrylate; tricyclodecenyl-containing polymerizable unsaturated monomers, such as tricyclodecenyl (meth)acrylate; aromatic ring-containing polymerizable unsaturated monomers, such as benzyl (meth)acrylate, styrene, α-methylstyrene, and vinyltoluene; phosphoric acid group-containing polymerizable unsaturated monomers, such as 2-acryloyloxyethyl acid phosphate, 2-methacryloyloxyethyl acid phosphate, 2-acryloyloxypropyl acid phosphate, and 2-methacryloyloxypropyl acid phosphate; sulfonic acid group-containing polymerizable unsaturated monomers, such as 2-acrylamide-2-methylpropanesulfonic acid, 2-sulfoethyl (meth)acrylate, allylsulfonic acid, and 4-styrenesulfonic acid; and sodium salts and ammonium salts of these sulfonic acids; acid anhydride group-containing polymerizable unsaturated monomers, such as maleic anhydride, itaconic anhydride, and citraconic anhydride; polyoxyalkylene-containing (meth)acrylic monomers, such as acrylic monomers that terminally contain a hydroxy group or a $C_{1-3}$ alkyleneoxy group, and that contain a polyoxyethylene group or a polyoxypropylene group; hydrolyzable silyl-containing polymerizable unsaturated monomers, such as vinyltrimethoxysilane, vinylmethyldimethoxysilane, vinyltriethoxysilane, vinylmethyldiethoxysilane, vinyltris(2-methoxyethoxy)silane, vinyltriisopropoxysilane, γ-(meth)acryloyloxypropyltrimethoxysilane, γ-(meth)acryloyloxypropylmethyldimethoxysilane, γ-(meth)acryloyloxypropyltriethoxysilane, γ-(meth)acryloyloxypropylmethyldiethoxysilane, γ-(meth)acryloyloxypropyltri-n-propoxysilane, γ-(meth)acryloyloxypropyltriisopropoxysilane, vinyltriacetoxysilane, and β-(meth)acryloyloxyethyltrimethoxysilane; perfluoroalkyl (meth)acrylates, such as perfluorobutylethyl (meth)acrylate and perfluorooctylethyl (meth)acrylate; fluorinated alkyl-containing polymerizable unsaturated monomers, such as fluoroolefin; vinyl compounds, such as N-vinylpyrrolidone, ethylene, butadiene, chloroprene, vinyl propionate, and vinyl acetate; nitrogen-containing polymerizable unsaturated monomers, such as (meth)acrylonitrile, (meth)acrylamide, methylenebis(meth)acrylamide, ethylenebis(meth) acrylamide, 2-(methacryloyloxy)ethyltrimethyl ammonium chloride, and adducts of glycidyl (meth)acrylate with amines; polymerizable unsaturated monomers having at least two polymerizable unsaturated groups per molecule, such as allyl (meth)acrylate and 1,6-hexanediol di(meth) acrylate; hydroxy-containing polymerizable unsaturated monomers; and the like. These can be used singly or in a combination of two or more.

Among these, phosphoric acid group-containing polymerizable unsaturated monomers, sulfonic acid group-containing polymerizable unsaturated monomers, acid anhydride group-containing polymerizable unsaturated monomers, polyoxyalkylene-containing (meth)acrylic monomers, and hydroxy-containing polymerizable unsaturated monomers are hydrophilic group-containing polymerizable unsaturated monomers.

Hydroxy-containing polymerizable unsaturated monomers can also preferably be used in the hydrophilic chain component (Y) in view of, for example, improving the water dispersibility of the acrylic urethane composite resin particles and imparting a crosslinkable functional group.

Examples of hydroxy-containing polymerizable unsaturated monomers include those mentioned as examples in the above description of the unsaturated monomer(s) (a2).

When a hydroxy-containing polymerizable unsaturated monomer is used, the amount of the hydroxy-containing polymerizable unsaturated monomer is 5 mass % or more, preferably 10 mass % or more, and even more preferably within the range of 15 to 70 mass % in other polymerizable unsaturated monomer(s) (b2).

In the graft acrylic resin (II-p), the proportions of the unsaturated monomers (a1) and (a2) in the hydrophobic chain component (X) can be as follows. Generally, the proportion of the monomer (a1) is preferably within the range of 0.1 to 10 mass %, and more preferably 0.1 to 5 mass %, based on the total amount of the unsaturated monomers (a1) and (a2), and the proportion of the monomer(s) (a2) is preferably within the range of 90 to 99.9 mass %, and more preferably 95 to 99.9 mass %, based on the total amount of the unsaturated monomers (a1) and (a2).

The proportions of the unsaturated monomers (b1) and (b2) in the hydrophilic chain component (Y) can be as follows. Generally, the proportion of the monomer (b1) is preferably within the range of 0.2 to 50 mass %, and more preferably 0.2 to 40 mass %, based on the total amount of the unsaturated monomers (b1) and (b2), and the proportion of the monomer(s) (b2) is preferably within the range of 50 to 99.8 mass %, and more preferably 60 to 99.8 mass %, based on the total amount of the unsaturated monomers (b1) and (b2).

Further, in the hydrophilic chain component (Y), the hydrophilic group-containing polymerizable unsaturated monomer content is preferably 10 to 50 mass %, more preferably 20 to 50 mass %, and even more preferably 20 to 40 mass %, based on the total amount of the unsaturated monomers (b1) and (b2), in view of water dispersibility.

In the hydrophobic chain component (X) and the hydrophilic chain component (Y), the amount of the carboxy groups contained in the hydrophilic chain component (Y) is preferably adjusted to be within the range of 1 to 20 mol, and particularly preferably 2 to 10 mol, per mol of the epoxy groups contained in the hydrophobic chain component (X), in view of the dispersion stability and storage stability of the acrylic urethane composite resin particles.

In the graft acrylic resin (II), the hydrophobic chain component (X) and the hydrophilic chain component (Y) may not be grafted together, and the graft acrylic resin (II) may contain unreacted molecules of the hydrophobic chain component (X) and hydrophilic chain component (Y) that have not undergone a grafting reaction.

In the present invention, even if such molecules that have not undergone a grafting reaction are contained, a mixture containing the unreacted portion is used as the graft acrylic resin (II) and used as a dispersion stabilizer of the acrylic urethane composite resin particles.

In the graft acrylic resin (II), the hydrophobic chain component (X)/hydrophilic chain component (Y) mass ratio is preferably within the range of 50/50 to 95/5, and particularly preferably 60/40 to 90/10, in view of the water dispersibility and storage stability of the acrylic urethane composite resin particles.

The polymerization method for the graft acrylic resin (II) is not particularly limited. For example, the graft acrylic resin (II) can be synthesized by, while heating in the presence of an organic solvent, adding a monomer composition constituting the hydrophobic chain component (X) dropwise to perform polymerization, and adding a monomer composition constituting the hydrophilic chain component (Y) to the copolymer solution of the hydrophobic chain component (X) dropwise to perform polymerization.

The reaction temperature in the polymerization of the hydrophobic chain component (X) and the hydrophilic chain component (Y) is generally within the range of about 60 to 200° C., and preferably about 70 to 160° C. The reaction time is generally about 10 hours or less, and preferably about 0.5 to 6 hours.

Examples of the polymerization initiator in the above reaction include organic peroxides, such as benzoyl peroxide, octanoyl peroxide, lauroyl peroxide, stearoyl peroxide, cumene hydroperoxide, tert-butyl peroxide, di-tert-amyl peroxide, t-butyl peroxy-2-ethylhexanoate, tert-butylperoxy laurate, tert-butylperoxyisopropyl carbonate, tert-butylperoxy acetate, and diisopropylbenzene hydroperoxide; azo compounds, such as azobisisobutyronitrile, azobis(2,4-dimethylvaleronitrile), azobis(2-methylpropionenitrile), azobis (2-methylbutyronitrile), 4,4'-azobis(4-cyanobutanoic acid), dimethyl azobis(2-methylpropionate), azobis[2-methyl-N-(2-hydroxyethyl)-propionamide], and azobis{2-methyl-N-[2-(1-hydroxybutyl)]-propionamide}; persulfates, such as potassium persulfate, ammonium persulfate, and sodium persulfate; and the like.

These polymerization initiators can be used singly or in a combination of two or more. In the polymerization reaction for the hydrophobic chain component (X) and the hydrophilic chain component (Y), there is no problem if the types or amounts of polymerization initiators are different.

The amount of the polymerization initiator is generally within the range of 0.01 to 20 mass %, particularly preferably 0.1 to 15 mass %, and further particularly preferably 0.3 to 10 mass %, based on the total amount of the polymerizable unsaturated monomers used in the step, in view of polymerization reactivity etc.

In view of the production, the synthesis of the graft acrylic resin (II) is preferably performed in the presence of an organic solvent. The organic solvent can be suitably selected in view of polymerization temperature and the dispersibility, storage stability, etc., of the acrylic urethane composite resin particles.

Preferable examples of the organic solvent include alcohol solvents, cellosolve solvents, carbitol solvent, and the like. Specific examples include alcohol solvents, such as n-butanol; cellosolve solvents, such as ethylene glycol monobutyl ether, ethylene glycol monoisopropyl ether, ethylene glycol monomethyl ether, propylene glycol monomethyl ether, propylene glycol monopropyl ether, propylene glycol mono-n-butyl ether, dipropylene glycol monomethyl ether, and dipropylene glycol mono-n-butyl ether; carbitol solvents, such as diethylene glycol monobutyl ether, diethylene glycol monoethyl ether, and diethylene glycol monoethyl ether acetate; and the like.

As the organic solvent, an inert organic solvent that does not mix with water, which is not listed above, can be used as long as it does not impair the water dispersion stability of the acrylic urethane composite resin particles. Examples of such organic solvents include aromatic hydrocarbon-based solvents, such as toluene and xylene; ester-based solvents, such as ethyl acetate and butyl acetate; ketone-based solvents, such as methyl ethyl ketone and cyclohexanone; and the like.

The graft acrylic resin (II) preferably has a weight average molecular weight of 5,000 or more, particularly preferably 5,000 to 50,000, and further particularly preferably 10,000 to 30,000, in view of the water dispersibility, storage stability, and production of the acrylic urethane composite resin particles.

In the present specification, the average molecular weight of a resin refers to a value calculated from a chromatogram measured by gel permeation chromatography based on the molecular weight of standard polystyrene. For the gel permeation chromatography, HLC8120GPC (produced by Tosoh Corporation) was used. The measurement was conducted using four columns, i.e., a TSKgel G-4000HXL, TSKgel G-3000HXL, TSKgel G-2500HXL, and TSKgel G-2000HXL (all produced by Tosoh Corporation, trade names), under the following conditions: mobile phase: tetrahydrofuran; measurement temperature: 40° C.; flow rate: 1 cc/min., and detector: RI.

In view of, for example, the dispersibility, storage stability, and water load resistance of the acrylic urethane composite resin particles, the graft acrylic resin (II) preferably has a hydroxy value of 50 to 250 mg KOH/g, particularly preferably 100 to 200 mg KOH/g, and further particularly preferably 150 to 200 mg KOH/g, and preferably has an acid value of 10 to 100 mg KOH/g, particularly preferably 20 to 70 mg KOH/g, and further particularly preferably 25 to 50 mg KOH/g.

Additionally, from the same viewpoint, the hydrophobic chain component of the graft acrylic resin (II) preferably has an acid value of 20 mg KOH or less, particularly preferably 10 mg KOH/g or less, and further particularly preferably 5 mg KOH/g or less, and the hydrophilic chain component preferably has an acid value of 50 to 400 mg KOH/g, particularly preferably 100 to 300 mg KOH/g, and further particularly preferably 150 to 300 mg KOH/g. Furthermore, the difference in acid value between the hydrophobic chain component and the hydrophilic chain component is preferably within the range of 30 to 400, particularly preferably 50 to 300, and further particularly preferably 100 to 300.

Method for Producing Acrylic Urethane Composite Resin Particles

The acrylic urethane composite resin particles are composite resin particles in which the acrylic urethane resin (I) is dispersed in an aqueous medium by using the graft acrylic resin (II) as a dispersion stabilizer.

The acrylic urethane composite resin particles can be produced by, for example, a production method comprising the following step:

synthesizing the acrylic urethane resin (I) in the presence of the graft acrylic resin in an aqueous medium, the graft acrylic resin being a hydrophobic-chain- and hydrophilic-chain-containing resin having a weight average molecular weight of 5,000 or more. The graft acrylic resin is intended to be used as a dispersion stabilizer, although the present invention is not bound to this.

A typical method for producing the acrylic urethane composite resin particles is described below. However, the method is not limited to this, and known methods for producing acrylic urethane composite resin particles can also be used.

The following is an example of a typical method for producing the acrylic urethane composite resin particles in which the urethane resin component (urethane prepolymer) is synthesized in the presence of an excess of isocyanates. As specific conditions of each step, those described above can be used.

1. First, a urethane prepolymer is synthesized by performing a polymerization reaction for the urethane resin component of the acrylic urethane resin (I) in some or all of the polymerizable unsaturated monomers of the acrylic resin component.

When the acrylic urethane resin (I) is an acrylic urethane graft resin (I-A) in which an acrylic resin component and an urethane resin component are grafted (bonded) together or when a polymerizable unsaturated monomer having active hydrogen atom(s) reactive with an isocyanate group is used as a constituent monomer component of the acrylic resin component to introduce a crosslinkable functional group, it is preferable that the polymerizable unsaturated monomer having active hydrogen atom(s) reactive with an isocyanate group not be used as the above polymerizable unsaturated monomers in the urethane prepolymer synthesis reaction, since the group having active hydrogen atom(s) reactive with an isocyanate group is reacted with the isocyanate groups of the urethane resin component.

The production in the polymerizable unsaturated monomers makes it possible to synthesize the urethane resin component without using unnecessary organic solvents. Since the polymerizable unsaturated monomers are present in the polymerization reaction for the urethane resin component, a means such as using a polymerization inhibitor is used to prevent polymerization of the polymerizable unsaturated monomers as described in the description of the urethane resin component of the acrylic urethane resin (I) above.

2. Next, if necessary, a blocking reaction of isocyanate groups is performed using a blocking agent.

3. When the polymerizable unsaturated monomer having active hydrogen atom(s) reactive with an isocyanate group is used as a constituent monomer component of the acrylic resin component, the polymerizable unsaturated monomer having active hydrogen atom(s) reactive with an isocyanate group is added, and, as necessary, is subjected to a urethanization reaction with the isocyanate groups of the urethane resin component to introduce the polymerizable unsaturated groups into the urethane resin component.

Thus, the acrylic resin component and the urethane resin component can be grafted together to be chemically bonded to each other via the polymerizable unsaturated monomer having active hydrogen atom(s) reactive with an isocyanate group by performing afterward a polymerization reaction for the acrylic resin component (polymerization reaction of polymerizable unsaturated groups).

In this process, the polymerizable unsaturated monomer having active hydrogen atom(s) reactive with an isocyanate group may be added in excess relative to the isocyanate groups of the urethane resin component so that the group having active hydrogen atom(s) reactive with an isocyanate group ultimately remains.

4. The graft acrylic resin (II) synthesized beforehand, which is a dispersion stabilizer, is added. The graft acrylic resin (II) is added so that the acrylic urethane resin (I):graft acrylic resin (II) ratio is preferably 20:80 to 95:5 (mass ratio), more preferably 40:60 to 90:10, and even more preferably 60:40 to 80:20.

5. If only some of the desired amount of the polymerizable unsaturated monomers is used in Items 1 and 3 above, the remaining polymerizable unsaturated monomers are further added.

6. Subsequently, a neutralizer for acid groups and deionized water are added to obtain an aqueous dispersion.

The neutralizer is not particularly limited as long as it can neutralize acid groups. Examples of basic compounds for neutralization include organic amines, such as ammonia, diethylamine, ethylethanolamine, diethanolamine, triethanolamine, monoethanolamine, monopropanolamine, isopropanolamine, ethylaminoethylamine, hydroxyethylamine, triethylamine, tributylamine, dimethylethanolamine, and diethylenetriamine; alkali metal hydroxides, such as caustic soda and caustic potash; and the like.

Such a neutralizer is preferably used in an amount such that the pH of the aqueous dispersion of the acrylic urethane composite resin particles is ultimately about 6.0 to 9.0.

The neutralizer is generally used in an amount of 0.1 to 1.5 equivalents, and preferably 0.3 to 1.2 equivalents, relative to the acid groups, such as carboxy.

As a method for obtaining the aqueous dispersion, dispersion can be performed using a usual stirrer. To obtain uniform aqueous dispersion of finer particles, homomixers, homogenizers, dispersing devices, line mixers, etc., can be used.

7. A radical polymerization initiator is added to the aqueous dispersion to allow a polymerization reaction of the polymerizable unsaturated monomers to proceed. If necessary, a chain extension reaction of the urethane resin component (urethane prepolymer) may be further conducted to complete all of the reactions.

When chain extension of the urethane prepolymer is performed, a chain extender other than water may be added, if necessary, to react the urethane prepolymer with the chain extender. As the chain extender, a known chain extender having active hydrogen can be used. Specific examples of such chain extenders include diamines, such as ethylenediamine, hexamethylenediamine, cyclohexanediamine, cyclohexylmethanediamine, and isophoronediamine; hydrazine; and the like.

An aqueous dispersion of the acrylic urethane composite resin particles can be produced by performing the above steps.

In view of dispersibility and storage stability, the acrylic urethane composite resin particles generally have an average particle size of 10 to 5,000 nm, preferably 10 to 1,000 nm, more preferably 20 to 500 nm, and even more preferably 50 to 300 nm.

In the present specification, the average particle size of the resin particles refers to a value obtained by measurement at 20° C. using a submicron particle size distribution analyzer after dilution with deionized water according to a usual method. For example, a COULTER N4 (trade name, produced by Beckman Coulter, Inc.) may be used as the submicron particle size distribution analyzer.

The solids concentration of the acrylic urethane composite resin particles in the aqueous dispersion is preferably 20 to 50 mass %, and more preferably 30 to 40 mass %. When the solids concentration is more than 50 mass %, an aqueous dispersion may be difficult to obtain because emulsification is difficult. When the solids concentration is less than 20 mass %, such a low concentration results in a high proportion of the solvent component (mainly water); therefore, it may be difficult to use such an aqueous dispersion as, for example, a component of an aqueous coating composition.

Reactive Group-Containing Resin (B)

The reactive group-containing resin is a resin other than the acrylic urethane composite resin particles (A). The type of the reactive group-containing resin is not particularly limited as long as it is a reactive group-containing resin. Examples include acrylic resins, polyester resins, urethane-modified polyester resins, epoxy resins, and the like.

A reactive group refers to a functional group with reactivity that enables a crosslinking reaction. Specific examples include functional groups with reactivity, such as hydroxy, acid group, carbonyl, N-methylol alkyl ether group, isocyanate, epoxy, amino, alkoxysilyl, carbodiimide group, and hydrazide group.

In the present invention, acrylic resins and polyester resins can preferably be used. These resins are described in more detail below.

Acrylic Resin

The acrylic resin is an acrylic resin, other than the acrylic urethane composite resin particles (A), that can be synthesized by copolymerizing polymerizable unsaturated monomers, as typified by vinyl monomers, according to a known method. The acrylic resin may be synthesized by emulsion polymerization or solution polymerization, or both methods may be used in combination. When the acrylic resin is synthesized by solution polymerization, as the organic solvent used for the reaction, it is preferred to use a hydrophilic organic solvent, such as a propylene glycol ether-based solvent or a dipropylene glycol ether-based solvent. In view of water dispersibility, the acrylic resin preferably contains acid groups, such as carboxy.

When the acrylic resin is synthesized by emulsion polymerization, it can be easily obtained by, for example, subjecting the above monomer components to emulsion polymerization in the presence of an emulsifier. Examples of emulsifiers include nonionic surfactants, anionic surfactants, copolymerizable-unsaturated-group-containing reactive surfactants, and the like. The acrylic resin can be obtained by emulsion polymerization using a polymerization initiator in the presence of one or more types of these emulsifiers. The acrylic resin also can be obtained by known suspension polymerization other than emulsion polymerization.

As the polymerizable unsaturated monomers, known polymerizable unsaturated monomers can be used. Examples include reactive group-containing polymerizable unsaturated monomers and other polymerizable unsaturated monomers.

Examples of the reactive group of the reactive group-containing polymerizable unsaturated monomer include functional groups with reactivity, such as hydroxy, acid group, carbonyl, N-methylol alkyl ether group, isocyanate, epoxy, amino, alkoxysilyl, carbodiimide group, and hydrazide group.

Examples of hydroxy-containing polymerizable unsaturated monomers include 2-hydroxyethyl(meth)acrylate, hydroxypropyl (meth)acrylate, 4-hydroxybutyl (meth)acrylate, tetrahydrofurfuryl (meth)acrylate, ε-caprolactone-modified tetrahydrofurfuryl (meth)acrylate, ε-caprolactone-modified hydroxyethyl (meth)acrylate, polyethylene glycol mono(meth)acrylate, polypropylene glycol mono(meth)acrylate, 2-hydroxy-3-phenoxypropyl (meth)acrylate, 2-hydroxy-3-butoxypropyl (meth)acrylate, phthalic acid monohydroxyethyl (meth)acrylate, and the like.

Examples of acid group-containing polymerizable unsaturated monomers include carboxy- or acid anhydride group-containing polymerizable unsaturated monomers and the like.

Examples of carboxy- or acid anhydride group-containing polymerizable unsaturated monomers include acrylic acid, methacrylic acid, maleic acid, fumaric acid, crotonic acid, itaconic acid, β-carboxyethyl acrylate, and like unsaturated carboxylic acids and acid anhydrides thereof.

Examples of polymerizable unsaturated monomers containing acid groups other than carboxy or acid anhydride groups include 2-acrylamide-2-methylpropanesulfonic acid, allylsulfonic acid, styrene sulfonic acid sodium salt, sulfoethyl methacrylate and sodium salts and ammonium salts thereof, and the like.

Examples of carbonyl-containing polymerizable unsaturated monomers include acrolein, diacetone acrylamide, diacetone methacrylamide, formylstyrol, $C_{4-7}$ vinyl alkyl ketones, such as vinyl methyl ketone, vinyl ethyl ketone, and vinyl butyl ketone, and the like. Particularly preferred among these are diacetone acrylamide and diacetone methacrylamide.

Examples of N-methylol alkyl ether group-containing polymerizable unsaturated monomers include N-methylolacrylamide butyl ether and the like.

The isocyanate-containing polymerizable unsaturated monomer is a compound having at least one unblocked isocyanate group and at least one radically polymerizable double bond per molecule. Examples include methacryloylisocyanate, 2-isocyanatoethyl methacrylate, m- or p-isopropenyl-α,α'-dimethylbenzyl isocyanate, 1:1 (molar ratio) adducts of a hydroxy-containing polymerizable unsaturated monomer and a diisocyanate compound (e.g., equimolar adduct of 2-hydroxyethyl acrylate and isophorone diisocyanate), and the like.

Examples of epoxy-containing polymerizable unsaturated monomers include glycidyl acrylate, glycidyl methacrylate, CYCLOMER A-200 (alicyclic epoxy-containing monomer), CYCLOMER M-100 (alicyclic epoxy-containing monomer), and the like.

Examples of amino-containing polymerizable unsaturated monomers include dimethylaminoethyl acrylate, dimethylaminoethyl methacrylate, diethylaminoethyl acrylate, diethylaminoethyl methacrylate, dimethylaminopropyl acrylamide, dimethylaminopropyl methacrylamide, and the like.

Examples of alkoxysilyl-containing polymerizable unsaturated monomers include vinyltrimethoxysilane, vinyltriethoxysilane, vinyltripropoxysilane, vinyltributoxysilane, (meth)acryloyloxymethyltrimethoxysilane, (meth)acryloyloxyethyltrimethoxysilane, γ-(meth)acryloyloxypropyltrimethoxysilane, γ-(meth)acryloyloxypropyltriethoxysilane, (meth)acryloyloxyethyltriethoxysilane, (meth)acryloyloxypropyltributoxysilane, vinyltris-β-methoxyethoxysilane, divinylmethoxysilane, divinyldi-β-methoxyethoxysilane, and the like.

Examples of other polymerizable unsaturated monomers include $C_{1-24}$ alkyl or cycloalkyl esters of (meth)acrylic acid, such as methyl (meth)acrylate, ethyl (meth)acrylate, butyl (meth)acrylate, 2-ethylhexyl (meth)acrylate, lauryl (meth)acrylate, and cyclohexyl (meth)acrylate; $C_{1-16}$ alkoxyalkyl esters of (meth)acrylic acid, such as methoxybutyl acrylate, methoxybutyl methacrylate, methoxyethyl acrylate, methoxyethyl methacrylate, ethoxybutyl acrylate, ethoxybutyl methacrylate, and phenoxyethyl (meth)acrylate; aromatic unsaturated monomers, such as styrene, vinyltoluene, α-methylstyrene, N-vinylpyrrolidone, and vinylpyridine; olefins, such as ethylene, propylene, butylene, and pentene; diene compounds, such as butadiene, isoprene, and chloroprene; cyclohexenyl (meth)acrylate, dicyclopentenyl (meth)acrylate, dicyclopentenyloxyethyl (meth)acrylate, isobornyl (meth)acrylate, benzyl (meth)acrylate, N-butoxy (meth)acrylamide, adducts of glycidyl (meth)acrylate with amines, vinyl propionate, vinyl acette, vinyl pivalate, Veova monomer (product of Shell Chemical Co.), and the like.

When the acrylic resin is synthesized by solution polymerization, it preferably has a weight average molecular weight of 1,000 to 200,000, and particularly preferably 2,000 to 100,000, in view of weather resistance, finishing quality, etc.

If the acrylic resin contains hydroxy groups, when the acrylic resin is synthesized by solution polymerization, it preferably has a hydroxy value of 10 to 250 mg KOH/g, and particularly preferably 30 to 150 mg KOH/g, in view of the curability of the coating film; when the acrylic resin is synthesized by emulsion polymerization, it preferably has a hydroxy value of 5 to 150 mg KOH/g, and particularly preferably 10 to 90 mg KOH/g, in view of the water resistance and curability of the coating film.

If the acrylic resin contains acid groups, when the acrylic resin is synthesized by solution polymerization, it preferably has an acid value of 3 to 150 mg KOH/g, and particularly preferably 5 to 70 mg KOH/g, in view of the dispersion stability in the aqueous coating composition and the curability and adhesion of the coating film; when the acrylic resin is synthesized by emulsion polymerization, it preferably has an acid value of 0.01 to 100 mg KOH/g, and particularly preferably 0.1 to 75 mg KOH/g, in view of the water resistance of the coating film.

When the acrylic resin contains acid groups and is dispersed in water, the acrylic resin is preferably neutralized by a neutralizer, to increase water dispersibility. This allows the acrylic resin to be mixed with water and to be dispersed in water more readily.

Examples of neutralizers include hydroxides of alkali metals or alkaline earth metals, such as sodium hydroxide, potassium hydroxide, lithium hydroxide, calcium hydroxide, and barium hydroxide; ammonia; primary monoamine compounds, such as ethylamine, propylamine, butylamine, cyclohexylamine, monoethanolamine, isopropanolamine, neopentanolamine, 2-aminopropanol, 3-aminopropanol, and 2-amino-2-methylpropanol; secondary monoamine compounds, such as diethylamine, dibutylamine, diethanolamine, dipropylamine, diisopropanolamine, N-methylethanolamine, N-ethylethanolamine, and N-methylisopropanolamine; tertiary monoamine compounds, such as triethylamine, tributylamine, dimethylethanolamine, diethylethanolamine, methyldiethanolamine, dimethylaminoethanol, and triethanolamine; polyamine compounds, such as ethylenediamine, diethylenetriamine, hydroxyethylaminoethylamine, ethylaminoethylamine, and methylaminopropylamine; pyridine; morpholine; and the like.

Among these, primary monoamine compounds, secondary monoamine compounds, tertiary monoamine compounds, and polyamine compounds are preferred.

Polyester Resin

The polyester resin can be synthesized by an esterification reaction of a polybasic acid with a polyhydric alcohol in a standard manner by a known method. In view of water dispersibility, the polyester resin preferably contains acid groups, such as carboxy.

The polybasic acid is a compound having at least two carboxy groups per molecule. Examples include phthalic acid, isophthalic acid, terephthalic acid, succinic acid, adipic acid, azelaic acid, sebacic acid, naphthalenedicarboxylic acid, 4,4-diphenyldicarboxylic acid, diphenylmethane-4,4'-dicarboxylic acid, HET acid, maleic acid, fumaric acid, itaconic acid, trimellitic acid, pyromellitic acid, cyclohexane-1,3-dicarboxylic acid, cyclohexane-1,4-dicarboxylic acid, hexahydrophthalic acid, hexahydroisophthalic acid, hexahydroterephthalic acid, tetrahydrophthalic acid, hexahydrotrimellitic acid, methylhexahydrophthalic acid, and anhydrides of these acids, and the like.

The polyhydric alcohol is a compound having at least two hydroxy groups per molecule. Examples include ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 3-methyl-1,2-butanediol, 1,2-pentanediol, 1,5-pentanediol, 1,4-pentanediol, 2,4-pentanediol, 2,3-dimethyltrimethylene glycol, tetramethylene glycol, 3-methyl-4,5-pentanediol, 2,2,4-trimethyl-1,3-pentanediol, 1,6-hexanediol, 1,5-hexanediol, 1,4-hexanediol, 2,5-hexanediol, neopentyl glycol, hydroxypivalic acid neopentyl glycol ester, and like glycols; polylactone diols obtained by adding lactones, such as ε-caprolactone, to such glycols; bis(hydroxyethyl) terephthalate and like polyester diols; 1,3-cyclohexanedimethanol; 1,4-cyclohexanedimethanol; tricyclodecanedimethanol; hydrogenated bisphenol A; hydrogenated bisphenol F; spiroglycol; dihydroxymethyltricyclodecane; glycerin; trimethylolpropane; trimethylolethane; diglycerin; triglycerin; 1,2,6-hexanetriol; pentaerythritol; dipentaerythritol; dipentaerythritol; sorbitol; mannitol; and 2,2-dimethylol propionic acid, 2,2-dimethylol butanoic acid, 2,2-dimethylol pentanoic acid, 2,2-dimethylol hexanoic acid, 2,2-dimethylol octanoic acid, and like hydroxy carboxylic acids.

Also usable as polyester resins are fatty acid-modified polyester resins modified with (semi)drying oil fatty acids, such as linseed oil fatty acid, coconut oil fatty acid, safflower oil fatty acid, soybean oil fatty acid, sesame oil fatty acid, perilla oil fatty acid, hempseed oil fatty acid, tall oil fatty acid, and dehydrated castor oil fatty acid. It is suitable that the amount of modification with such fatty acid is generally 30 wt. % or less in terms of oil length. The polyester resin may be one in which a part of a monobasic acid, such as benzoic acid, is reacted.

The polyester resin may be one in which an α-olefin epoxide, such as propylene oxide or butylene oxide, a monoepoxy compound, such as Cardura E10 (produced by Japan Epoxy Resins Co., Ltd., trade name, glycidyl ester of a synthetic hyperbranched saturated fatty acid), or the like is reacted with acid groups in the polyester resin.

Carboxy groups can be introduced into the polyester resin by, for example, adding an acid anhydride to a hydroxy-containing polyester for half-esterification.

When the polyester resin contains hydroxy groups, it preferably has a hydroxy value of 10 to 250 mg KOH/g, and particularly preferably 40 to 170 mg KOH/g, in view of the water resistance and curability of the coating film.

When the polyester resin contains acid groups, it preferably has an acid value of 5 to 100 mg KOH/g, and particularly preferably 10 to 60 mg KOH/g, in view of the water resistance and adhesion of the coating film.

The polyester resin preferably has a number average molecular weight of 1,000 to 100,000, and particularly preferably 1,000 to 50,000, in view of the water resistance and curability of the coating film.

When the polyester resin contains acid groups and is dispersed in water, the polyester resin is preferably neutralized by a neutralizer to increase water dispersibility. This allows the polyester resin to be mixed with water and to be dispersed in water more readily.

Examples of neutralizers include those mentioned in the description of the acrylic resin above.

Crosslinking Agent (C)

The crosslinking agent (C) may be contained, if necessary. There is no limitation on the crosslinking agent (C). Depending on the reactive groups of the reactive group-containing resin (B) and, when the acrylic urethane composite resin particles (A) contain crosslinking reactive groups, the crosslinking reactive groups, a crosslinking agent that is reactive with these reactive groups can be used.

Specific examples of the crosslinking agent (C) include amino resins, polyisocyanate compounds, polyhydrazide compounds, polysemicarbazide compounds, carbodiimide group-containing compounds, oxazoline group-containing compounds, epoxy compounds, polycarboxylic acids, and the like. The curing agents may be used singly or in a combination of two or more.

Usable amino resins include partially or fully methylolated amino resins obtained by reacting amino components with aldehyde components. Examples of the amino components include melamine, urea, benzoguanamine, acetoguanamine, steroguanamine, spiroguanamine, dicyandiamide, and the like. Examples of the aldehyde components include formaldehyde, paraformaldehyde, acetaldehyde, benzaldehyde, and the like.

The methylolated amino resins in which some or all of the methylol groups have been etherified with suitable alcohol are also usable. Examples of alcohols that can be used for the etherification include methyl alcohol, ethyl alcohol, n-propyl alcohol, i-propyl alcohol, n-butyl alcohol, i-butyl alcohol, 2-ethyl-1-butanol, 2-ethyl-1-hexanol, and the like.

A melamine resin is preferable as the amino resin. In particular, a methyl-etherified melamine resin obtained by etherifying some or all of the methylol groups of a partially or fully methylolated melamine resin with methyl alcohol, a butyl-etherified melamine resin obtained by etherifying some or all of the methylol groups of a partially or fully methylolated melamine resin with butyl alcohol, a methyl-butyl mixed etherified melamine resin obtained by etherifying some or all of the methylol groups of a partially or fully methylolated melamine resin with methyl alcohol and butyl alcohol are preferable. Particularly preferred is a methyl-butyl mixed etherified melamine resin.

The melamine resin preferably has a weight average molecular weight of 400 to 6,000, more preferably 500 to 4,000, and even more preferably 600 to 3,000.

A commercially available melamine resin can be used as the melamine resin. Examples of commercially available melamine resins include Cymel 202, Cymel 203, Cymel 204, Cymel 211, Cymel 212, Cymel 238, Cymel 251, Cymel 253, Cymel 254, Cymel 303, Cymel 323, Cymel 324, Cymel 325, Cymel 327, Cymel 350, Cymel 370, Cymel 380, Cymel 385, Cymel 1156, Cymel 1158, Cymel 1116, and Cymel 1130 (produced by Nihon Cytec Industries Inc.); Resimene 735, Resimene 740, Resimene 741, Resimene 745, Resimene 746, and Resimene 747 (produced by Monsanto Co., Ltd.); U-VAN 120, U-VAN 20HS, U-VAN 20SE, U-VAN 2021, U-VAN 2028, and U-VAN 28-60 (produced by Mitsui Chemicals, Inc.); Sumimal M55, Sumimal M30W, and Sumimal M50W (produced by Sumitomo Chemical Co., Ltd.); and the like.

When a melamine resin is used as the crosslinking agent (C), examples of usable curing catalysts include sulfonic acids, such as p-toluenesulfonic acid, dodecylbenzenesulfonic acid, and dinonylnaphthalene sulfonic acid; salts obtained by neutralizing such sulfonic acids with amines; salts obtained by neutralizing phosphoric ester compounds with amines; and the like.

The polyisocyanate compound has at least two isocyanate groups per molecule.

Specific examples of the polyisocyanate compound include aliphatic polyisocyanates, alicyclic polyisocyanates, aromatic aliphatic polyisocyanates, aromatic polyisocyanates, derivatives of these polyisocyanates, and the like.

Examples of aliphatic polyisocyanates include trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, 2,6-diisocyanatomethylcaproate, and like aliphatic diisocyanates; lysine ester triisocyanate, 1,4,8-triisocyanato octane, 1,6,11-triisocyanato undecane, 1,8-diisocyanato-4-isocyanato methyloctane, 1,3,6-triisocyanato hexane, 2,5,7-trimethyl-1,8-diisocyanato-5-isocyanato methyloctane, and like aliphatic triisocyanates; and the like.

Examples of alicyclic polyisocyanates include 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4,4'-methylenebis(cyclohexylisocyanate), methyl-2,4-cyclohexane diisocyanate, methyl-2,6-cyclohexane diisocyanate, 1,3- or 1,4-bis(isocyanatomethyl)cyclohexane (common name: hydrogenated xylylene diisocyanate) or a mixture thereof, norbornane diisocyanate, and like alicyclic diisocyanates; 1,3,5-triisocyanato cyclohexane, 1,3,5-trimethylisocyanato cyclohexane, 2-(3-isocyanatopropyl)-2,5-di(isocyanatomethyl)-bicyclo(2.2.1)heptane, 2-(3-isocyanatopropyl)-2,6-di(isocyanatomethyl)-bicyclo(2.2.1)heptane, 3-(3-isocyanatopropyl)-2,5-di(isocyanatomethyl)-bicyclo(2.2.1)heptane, 5-(2-isocyanatoethyl)-2-isocyanatomethyl-3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)heptane, 6-(2-isocyanatoethyl)-2-isocyanatomethyl-2-(3-isocyanatopropyl)-bicyclo(2.2.1)heptane, and like alicyclic triisocyanates; and the like.

Examples of aromatic aliphatic polyisocyanates include 1,3- or 1,4-xylylene diisocyanate or a mixture thereof, ω,ω'-diisocyanato-1,4-diethylbenzene, 1,3- or 1,4-bis(1-isocyanato-1-methylethyl)benzene (common name: tetramethylxylylene diisocyanate) or a mixture thereof, and like aromatic aliphatic diisocyanates; 1,3,5-triisocyanatomethylbenzene and like aromatic aliphatic triisocyanates; and the like.

Examples of aromatic polyisocyanates include m-phenylene diisocyanate, p-phenylene diisocyanate, 4,4'-diphenyl diisocyanate, 1,5-naphthalene diisocyanate, 2,4'- or 4,4'-diphenylmethane diisocyanate or a mixture thereof, 2,4- or 2,6-tolylene diisocyanate or a mixture thereof, 4,4'-toluidine diisocyanate, 4,4'-diphenylether diisocyanate, and like aromatic diisocyanates; triphenylmethane-4,4',4''-triisocyanate, 1,3,5-triisocyanato benzene, 2,4,6-triisocyanato toluene, and like aromatic triisocyanates; diphenylmethane-2,2',5,5'-tetraisocyanate and like aromatic tetraisocyanates; and the like.

Examples of polyisocyanate derivatives include dimers, trimers, biurets, allophanates, carbodiimides, urethodiones, urethoimines, isocyanurates, oxadiazine triones, polymethylene polyphenyl polyisocyanates (crude MDI, polymeric MDI), crude TDI, and the like of the polyisocyanate compounds mentioned above.

A blocked polyisocyanate compound in which free isocyanate groups are blocked with a blocking agent can be used as a polyisocyanate compound. When a blocked polyisocyanate compound is heated at, for example, 100° C. or higher, and preferably 130° C. or higher, isocyanate groups are regenerated and can readily react with reactive groups.

Examples of the blocking agent include phenol, cresol, xylenol, nitrophenol, ethylphenol, hydroxydiphenyl, butylphenol, isopropylphenol, nonylphenol, octylphenol, methyl hydroxybenzoate, and like phenol compounds; ε-caprolactam, δ-valerolactam, γ-butyrolactam, ρ-propiolactam, and like lactam compounds; methanol, ethanol, propyl alcohol, butyl alcohol, amyl alcohol, lauryl alcohol, and like aliphatic alcohol compounds; ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol, and like ether compounds; benzyl alcohol; glycolic acid; methyl glycolate, ethyl glycolate, butyl glycolate, and like glycolates; lactic acid, methyl lactate, ethyl lactate, butyl lactate, and like lactates; methylol urea, methylol melamine, diacetone alcohol, 2-hydroxyethyl acrylate, 2-hydroxyethyl methacrylate, and like alcohol compounds; formamide oxime, acetamide oxime, acetoxime, methyl ethyl ketoxime, diacetyl monoxime, benzophenone oxime, cyclohexane oxime, and like oxime compounds; dimethyl malonate, diethyl malonate, ethyl acetoacetate, methyl acetoacetate, acetylacetone, and like active methylene compounds; butyl mercaptan, t-butyl mercaptan, hexyl mercaptan, t-dodecyl mercaptan, 2-mercaptobenzothiazole, thiophenol, methylthiophenol, ethylthiophenol, and like mercaptan compounds; acetanilide, acetanisidide, acetotoluide, acrylamide, methacrylamide, acetic acid amide, stearic acid amide, benzamide, and like acid amide compounds; succinimide, phthalimide, maleimide, and like imide compounds; diphenylamine, phenylnaphthylamine, xylidine, N-phenylxylidine, carbazole, aniline, naphthylamine, butylamine, dibutylamine, butylphenylamine, and like amines; imidazole, 2-ethylimidazole, and like imidazole compounds; 3,5-dimethylpyrazole and like pyrazole compounds; urea, thiourea, ethylene urea, ethylenethiourea, diphenylurea, and like urea compounds; phenyl N-phenylcarbamate and like carbamate compounds; ethyleneimine, propyleneimine, and like imine compounds; sodium bisulfite, potassium bisulfite, and like sulfite compounds; and the like.

When the polyisocyanate compound is used as the crosslinking agent (C), an organic tin compound or the like can be used as a curing catalyst.

The polyisocyanate compound can be used, for example as a crosslinking agent for a hydroxy-containing resin or an amino-containing resin.

The polyhydrazide compound has at least two hydrazide groups per molecule.

Examples of polyhydrazide compounds include oxalic acid dihydrazide, malonic acid dihydrazide, succinic acid dihydrazide, glutaric acid dihydrazide, adipic acid dihydrazide, sebacic acid dihydrazide, and like $C_{2-18}$ saturated aliphatic carboxylic acid dihydrazides; maleic acid dihydrazide, fumaric acid dihydrazide, itaconic acid dihydrazide, and like monoolefinic unsaturated dicarboxylic acid dihydrazides; carbonic acid dihydrazide and like carbonic acid polyhydrazides; dihydrazide of phthalic acid, terephthalic acid, or isophthalic acid, dihydrazide, trihydrazide, or tetrahydrazide of pyromellitic acid, and like aromatic polycarboxylic acid polyhydrazides; nitrilotriacetic acid trihydrazide, citric acid trihydrazide, 1,2,4-benzene trihydrazide, and like aliphatic trihydrazide; ethylenediaminetetraacetic acid tetrahydrazide, 1,4,5,8-naphthoic acid tetrahydrazide, and like tetrahydrazides; polyhydrazides obtained by reacting a carboxylic-acid-lower-alkyl-ester-group-containing oligomer with hydrazine or hydrazine hydrate (see JPS52-022878B); and the like.

If the hydrophobic properties of the polyhydrazide compound are too high, a uniform crosslinked film cannot be obtained because water dispersion is difficult. Thus, the polyhydrazide compound having moderate hydrophilic properties and a relatively low molecular weight (about 300 or less) is preferred. Examples of such polyhydrazide compounds include $C_{4-12}$ dicarboxylic acid dihydrazide compounds, such as succinic acid dihydrazide, glutaric acid dihydrazide, adipic acid dihydrazide, and sebacic acid dihydrazide.

The polyhydrazide compound can be used, for example, as a crosslinking agent for a carbonyl-containing resin.

The polysemicarbazide compound has at least two semicarbazide groups per molecule.

Examples of polysemicarbazide compounds include aliphatic, alicyclic, or aromatic bissemicarbazides; polyfunctional semicarbazides obtained by subjecting a diisocyanate such as hexamethylene diisocyanate or isophorone diisocyanate, or a polyisocyanate compound derived therefrom, to a reaction with excess N,N-substituted hydrazine such as N,N-dimethyl hydrazine or the hydrazides mentioned above; aqueous polyfunctional semicarbazides obtained by subjecting the isocyanate group in the product derived from the reaction between the polyisocyanate compound and the hydrophilic group-containing active hydrogen compound such as polyether, polyol, or polyethylene glycol mono-alkyl ether, to excess reaction with the dihydrazides (e.g., JPH08-151358A) mentioned above; semicarbazide group-containing compounds, such as a mixture of the polyfunctional semicarbazide and the aqueous polyfunctional semicarbazide; hydrazone group-containing compounds, such as his acetyldihydrazone; and the like.

The polysemicarbazide compound can be used, for example, as a crosslinking agent for a carbonyl-containing resin.

The carbodiimide group-containing compound can be obtained, for example, by subjecting isocyanate groups in a polyisocyanate compound to a carbon dioxide removal reaction.

Examples of commercial products for the carbodiimide group-containing compound include Carbodilite V-02, Carbodilite V-02-L2, Carbodilite V-04, Carbodilite E-01, Carbodilite E-02 (trade names; all produced by Nisshinbo), and the like.

The carbodiimide group-containing compound can be used, for example, as a crosslinking agent for a carboxy-containing resin.

Examples of oxazoline group-containing compounds include oxazoline group-containing polymers, for example, (co)polymers obtained by (co)polymerizing an oxazoline group-containing polymerizable unsaturated monomer and, if necessary, one or more other polymerizable unsaturated monomers by a known method (e.g., solution polymerization, emulsion polymerization, and the like).

Examples of the oxazoline group-containing polymerizable unsaturated monomer include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-ethyl-2-oxazoline, and the like.

Examples of other polymerizable unsaturated monomers described above include $C_{1-24}$ alkyl or cycloalkyl esters of (meth)acrylic acid, such as methyl (meth)acrylate, ethyl (meth)acrylate, propyl (meth)acrylate, butyl (meth)acrylate, 2-ethylhexyl (meth)acrylate, cyclohexyl (meth)acrylate, lauryl (meth)acrylate, and isobornyl (meth)acrylate; $C_{2-8}$ hydroxyalkyl esters of (meth)acrylic acid, such as 2-hydroxyethyl(meth)acrylate and hydroxypropyl (meth)acrylate; vinyl aromatic compounds, such as styrene and vinyltoluene; (meth)acrylamide, dimethylaminopropyl (meth)acrylamide, dimethylaminoethyl (meth)acrylate, adducts of glycidyl (meth)acrylate with amines; polyethylene glycol (meth)acrylate; N-vinylpyrrolidone; ethylene; butadiene; chloroprene; vinyl propionate; vinyl acetate; (meth)acrylonitrile; and the like. These can suitably be used singly or in a combination of two or more.

The oxazoline group-containing compound can be used, for example, as a crosslinking agent for a carboxy-containing resin.

The epoxy compound has at least two epoxy groups per molecule. Specific examples include bis(3,4-epoxycyclohexylmethyl)adipate and like diepoxy compounds, epoxy-containing acrylic resins, and the like.

The epoxy compound can be used, for example, as a crosslinking agent for an acid group-containing resin or an amino group-containing resin.

Examples of polycarboxylic acids include aliphatic polybasic acids, such as adipic acid, azelaic acid, sebacic acid, 1,4-cyclohexanedicarboxylic acid, 1,2-cyclohexanedicarboxylic acid, 1,2,4-butanetricarboxylic acid, and 1,2,3,4-butanetetracarboxylic acid: aromatic polybasic acids, such as phthalic acid, isophthalic acid, terephthalic acid, and trimellitic acid; half esters formed by an addition reaction of a polyol and a 1,2-acid anhydride; products generated through an addition reaction of polyepoxide and two equivalents or more of 1,2-acid anhydride relative to the epoxy groups of the polyepoxide; carboxy-containing acrylic polymers; acrylic polymers containing half-esterified acid anhydride groups; carboxy-containing polyester polymers; and the like.

The polycarboxylic acid can be used, for example, as a crosslinking agent for an epoxy group-containing resin or a carbodiimide group-containing resin.

Aqueous Coating Composition

The amounts of the acrylic urethane composite resin particles (A), reactive group-containing resin (B), and crosslinking agent (C) in the aqueous coating composition of the present invention are as follows. It is suitable that the amount of the acrylic urethane composite resin particles (A) is 1 to 99 mass %, preferably 1 to 80 mass %, and more preferably 3 to 70 mass %, the amount of the reactive group-containing resin (B) is 1 to 99 mass %, preferably 1 to 90 mass %, and more preferably 5 to 80 mass %, and the amount of the crosslinking agent (C) is 0 to 60 mass %, preferably 0 to 40 mass %, and more preferably 0 to 30 mass %, based on the total resin solids content of the component (A), the component (B), and the component (C).

The aqueous coating composition of the present invention may comprise a pigment, if necessary. Preferable examples of usable pigments include coloring pigments, such as titanium oxide, zinc oxide, carbon black, phthalocyanine blue, Prussian blue, cobalt blue, azo pigments, phthalocyanine pigments, quinacridone pigments, isoindoline pigments, threne pigments, and perylene pigments; extender pigments, such as talc, clay, kaolin, baryta, barium sulfate, barium carbonate, calcium carbonate, silica, and alumina white; effect pigments, such as aluminum powder, mica powder, and titanium oxide-coated mica powder; and the like.

It is suitable that the amount of the pigment is generally in the range of 0 to 250 mass %, in particular 3 to 150 mass %, based on the total resin solids content of the component (A), the component (B), and the component (C), which is optionally contained.

The aqueous coating composition of the present invention may further comprise, if necessary, a curing catalyst, a dispersant, an antisettling agent, an organic solvent, an antifoaming agent, a thickener, a UV absorber, a light stabilizer, a surface control agent, etc.

The aqueous coating composition of the present invention makes it possible to obtain a coating film that is excellent in coating film performance, such as water resistance, and finished appearance, such as the smoothness of the coated surface, and the aqueous coating composition of the present invention has excellent storage stability; therefore, the aqueous coating composition of the present invention is suitable for use, for example, as a coating composition for building materials, architecture, automobiles, or the like.

The aqueous coating composition of the present invention can be applied by a known method, such as roller coating, air spray coating, airless spray coating, rotary atomization coating, or curtain coating. An electrostatic charge may be applied in the coating, if necessary. Such a coating method can be performed once or several times until the desired film thickness is obtained. The thickness of the coating film is preferably within the range of 3 to 100 μm, and particularly preferably 5 to 60 μm when cured. The coating film may be cured, for example, by heating at room temperature to 170° C., if necessary. Heat-curing can be performed by known heating means, for example, by using a hot air furnace, electric furnace, electromagnetic induction heating furnace, or like drying furnace. If necessary, pre-heating may be performed at a temperature of about 50 to 80° C. for about 3 to 10 minutes before heat-curing to promote vaporization of volatile components such as solvents.

The substrate is not particularly limited. Preferable examples of substrates include cold-rolled steel plates, galvanized steel plates, zinc alloy-plated steel plates, stainless steel plates, tinned steel plates, and like steel plates, aluminum plates, aluminum alloy plates, and like metal substances; polyethylene resin, polypropylene resin, acrylonitrile-butadiene-styrene (ABS) resin, polyamide resin, acrylic resin, vinylidene chloride resin, polycarbonate resin, polyurethane resin, epoxy resin, and like resins, various plastic substances, such as FRP; a concrete surface, a mortar surface, slate plates, roof tiles, PC plates, ALC plates, cement, cement calcium silicate plates, pottery, tiles, glass, wood, stone, a surface of a coating film, and the like. Among these, metal substances and plastic substances are preferred.

The substrate may be, for example, the body of a vehicle formed from the materials mentioned above, such as an automobile, motorcycle, or container; or a building material formed from those materials.

The substrate may be a metal substrate or a vehicle body mentioned above, the metal surface of which has been subjected to a surface treatment, such as phosphate treatment, chromate treatment, or composite oxide treatment.

The substrate may have been subjected beforehand to undercoating (e.g., cationic electrodeposition coating) and, if necessary, further, intermediate coating or the like.

The substrate may have a coating film of a colored coating composition or the like further formed on the intermediate coating surface.

When used, the aqueous coating composition of the present invention can be diluted to an appropriate viscosity by adding water and/or an organic solvent, etc., if necessary, and then applied.

The appropriate viscosity may vary depending on the formulation of the coating composition, but is, for example, generally in the range of about 20 to 60 seconds, and preferably about 25 to 50 seconds, as adjusted and measured at 20° C. using Ford Cup Viscometer No. 4. In this case, the coating composition of the present invention generally has a solids concentration of about 5 to 70 mass %, and preferably about 10 to 50 mass %.

EXAMPLES

The present invention is described in more detail below with reference to Examples and Comparative Examples but is not limited to these Examples. "Parts" and "%" are expressed on a mass basis.

Production of Graft Acrylic Resin (II)

Production Example 1

30 parts of diethylene glycol monoethyl ether acetate was placed in a reactor equipped with a thermometer, a thermostat, a stirrer, and a reflux condenser and heated to 145° C. under a nitrogen gas stream. Thereafter, the nitrogen gas stream was stopped, and as a first stage (for hydrophobic chain component (X)), a mixture of 23.8 parts of n-butyl acrylate, 14 parts of n-butyl methacrylate, 7 parts of styrene, 24.5 parts of 2-hydroxyethyl methacrylate, 0.7 parts of glycidyl methacrylate, and 3.0 parts of di-t-butylperoxide, which is an initiator, was added dropwise over a period of 4 hours and then maintained at the above temperature for 30 minutes.

Further, as a second stage (for hydrophilic chain component (Y)), a mixture of 9 parts of n-butyl acrylate, 12 parts of 2-hydroxyethyl methacrylate, 9 parts of acrylic acid, and 1.0 part of di-t-butylperoxide was added dropwise over a period of 30 minutes and then maintained at the above temperature. The point in time at which the graft rate was 90% or more was regarded as the endpoint, and the mixture was cooled to room temperature.

Graft rate (%)=(1−(epoxy value after completion of reaction of the second stage/epoxy value after completion of reaction of the first stage))×100

Thereafter, 51 parts of diethylene glycol monoethyl ether acetate was added, thereby obtaining a graft acrylic resin (II-1) solution having a solids content of 55%. The weight average molecular weight of the obtained graft acrylic resin (II-1) was 15,000.

Production Examples 2 to 5, 7, 8, and 10

Solutions of graft acrylic resins (II-2) to (II-5), (II-7), (II-8), and (II-10) were produced in the same manner as in Production Example 1, except that the formulations shown in Table 1 below were used. In the production, the amount of initiator was adjusted to adjust the weight average molecular weight. Table 1 also shows the weight average molecular weight of each of the obtained graft acrylic resins (II).

Table 1 shows the composition ratios of the hydrophobic chain component (first stage) and the hydrophilic chain component (second stage), based on the total amount, taken as 100, of each resin component.

Each of the graft acrylic resins (II-1) to (II-5), (II-7), (II-8), and (II-10) is a graft acrylic resin (graft acrylic resin (II-p)) in which the hydrophobic chain component (X) and the hydrophilic chain component (Y) are grafted together by a reaction of the epoxy groups in the hydrophobic chain component (X) with the carboxy groups in the hydrophilic chain component (Y).

Production Example 6

30 parts of diethylene glycol monoethyl ether acetate was placed in a reactor equipped with a thermometer, a thermostat, a stirrer, and a reflux condenser and heated to 145° C. under a nitrogen gas stream. Thereafter, the nitrogen gas stream was stopped, and as a first stage (for hydrophobic chain component (X)), a mixture of 35 parts of n-butyl acrylate, 27.3 parts of n-butyl methacrylate, 7 parts of styrene, 0.7 parts of 2-isocyanatoethyl methacrylate, and 3.0 parts of di-t-butylperoxide, which is an initiator, was added dropwise over a period of 4 hours and then maintained at the above temperature for 30 minutes.

Further, as a second stage (for hydrophilic chain component (Y)), a mixture of 9 parts of n-butyl acrylate, 12 parts of 2-hydroxyethyl methacrylate, 9 parts of acrylic acid, and 1.0 part of di-t-butylperoxide was added dropwise over a period of 30 minutes and then maintained at the above temperature. The point in time at which the graft rate was 90% or more was regarded as the endpoint, and the mixture was cooled to room temperature.

Graft rate (%)=(1−(NCO value after completion of reaction of the second stage/NCO value after completion of reaction of the first stage))×100

Thereafter, 51 parts of diethylene glycol monoethyl ether acetate was added, thereby obtaining a graft acrylic resin (II-6) solution having a solids content of 55%. The weight average molecular weight of the obtained graft acrylic resin (II-6) was 15,000.

The graft acrylic resin (II-6) is a graft acrylic resin in which the hydrophobic chain component (X) and the hydrophilic chain component (Y) are grafted together by a reaction of the isocyanate groups in the hydrophobic chain component (X) with the hydroxy groups in the hydrophilic chain component (Y).

Production Example 9

30 parts of diethylene glycol monoethyl ether acetate was placed in a reactor equipped with a thermometer, a thermostat, a stirrer, and a reflux condenser and heated to 145° C. under a nitrogen gas stream. Thereafter, the nitrogen gas stream was stopped. 33.5 parts of n-butyl acrylate, 14 parts of n-butyl methacrylate, 7 parts of styrene, 36.5 parts of 2-hydroxyethyl methacrylate, and 9 parts of acrylic acid, as well as 4.0 parts of di-t-butylperoxide, which is an initiator, were added dropwise over a period of 4 hours and then maintained at the above temperature for 2 hours. 51 parts of diethylene glycol monoethyl ether acetate was then added, thereby obtaining a graft acrylic resin (II-9) solution having a solids content of 55%. The weight average molecular weight of the obtained acrylic resin (II-9) was 15,000 (described also in Table 1).

As is clear from the above, the acrylic resin of Production Example 9 is an acrylic resin obtained by single-stage polymerization, not a graft acrylic resin.

The graft acrylic resins (II-9) and (II-10) are resins used for producing the acrylic urethane composite resin particles of Comparative Examples (in the table, the resin (II-9) is described as graft acrylic resin for convenience; however, the graft acrylic resin (II-9) is not a graft acrylic resin, as described above).

Table 1 shows the calculated acid value and hydroxy value of each of the graft acrylic resins (II). Table 1 also shows the calculated acid value and hydroxy value of each of the hydrophobic chain component (X) and the hydrophilic chain component (Y). Table 1 further shows the calculated SP value of each of the hydrophobic chain component (X) and the hydrophilic chain component (Y).

TABLE 1

| Production Example No. | | 1 | 2 | 3 | 4 | 5 | 6 | 7 | 8 | 9 | 10 |
|---|---|---|---|---|---|---|---|---|---|---|---|
| Graft acrylic resin (II) | | II-1 | II-2 | II-3 | II-4 | II-5 | II-6 | II-7 | II-8 | II-9 | II-10 |
| Hydrophobic | N-butyl acrylate | | | 34 | | | 50 | 19 | 44 | 33.5 | 34 |
| chain | N-butyl methacrylate | | | 20 | | | 39 | | 45 | 14 | 20 |
| component | 2-Ethylhexyl acrylate | | | | | | | 50 | | | |
| (total: | Styrene | | | 10 | | | 10 | 5 | 10 | 7 | 10 |
| 100) | 2-Hydroxyethyl methacrylate | | | 35 | | | | 25 | | 36.5 | 35 |
| | Glycidyl methacrylate | | | 1 | | | | | 1 | | 1 |
| | 2-Isocyanatoethyl methacrylate | | | | | | 1 | | | | |
| | Acrylic acid | | | | | | | | | 9 | |

TABLE 1-continued

| Production Example No. | | 1 | 2 | 3 | 4 | 5 | 6 | 7 | 8 | 9 | 10 |
|---|---|---|---|---|---|---|---|---|---|---|---|
| Acid value of hydrophobic chain component (mg KOH/g) | | | | | | 0 | | | | Copolymer obtained by single-stage polymerization | |
| Hydroxy value of hydrophobic chain component (mg KOH/g) | | | | 151 | | | 0 | 108 | 0 | | 151 |
| Solubility parameter of hydrophobic chain component | | | | | 9.1 | | 8.6 | 8.6 | 8.5 | | 9.1 |
| Percentage of hydrophobic chain component (%) | | 70 | | 90 | 50 | | 70 | | | | 70 |
| Hydrophilic chain component (total: 100) | N-butyl acrylate | | 30 | | | 20 | 30 | | 70 | | 30 |
| | N-butyl methacrylate | | | | | | | 10 | | | |
| | Ethyl acrylate | | | | | | | 20 | | | |
| | 2-Hydroxyethyl methacrylate | | 40 | | | 30 | 40 | 50 | | | 40 |
| | Acrylic acid | | | | | 30 | | 20 | 30 | | 30 |
| | Polyethylene glycol methacrylate | | | | | 20 | | | | | |
| Acid value of hydrophilic chain component (mg KOH/g) | | | | | 234 | | | 156 | 234 | | 234 |
| Hydroxy value of hydrophilic chain component (mg KOH/g) | | | | 173 | | 130 | 173 | 216 | 0 | | 173 |
| Solubility parameter of hydrophilic chain component | | | | | 10.4 | | | 10.1 | 9.9 | | 10.4 |
| Percentage of hydrophilic chain component (%) | | 30 | | 10 | 50 | | 30 | | | | 30 |
| Weight average molecular weight | | 15,000 | 5,500 | 15,000 | 20,000 | | 15,000 | | | 15,000 | 4,000 |
| Acid value of graft acrylic resin (mg KOH/g) | | 70 | | 23 | 117 | 70 | | 47 | 70 | 70 | |
| Hydroxy value of graft acrylic resin | | 158 | | 153 | 162 | 158 | 52 | 140 | 0 | 158 | |

Production of Acrylic Urethane Composite Resin Particles (A)

Production Example 11

17.2 parts of ETERNACOLL UH-100 (trade name, produced by Ube Industries, Ltd., 1,6-hexanediol-based polycarbonate diol, molecular weight: 1,000) and 2.5 parts of dimethylol butanoic acid, both of which are starting materials of the urethane resin component, 24 parts of n-butyl acrylate and 1.5 parts of ethylene glycol dimethacrylate, both of which are polymerizable unsaturated monomers of the acrylic resin component, and 0.008 parts of butylhydroxytoluene as a polymerization inhibitor for unsaturated groups were placed in a reactor equipped with a thermometer, a thermostat, a stirrer, and a reflux condenser. After the mixture was heated to 100° C. while stirring, 10.3 parts of hydrogenated MDI (4,4'-dicyclohexylmethane diisocyanate), which is a starting material of the urethane resin component, was further added dropwise over a period of 30 minutes.

Thereafter, while the temperature was maintained at 100° C., a reaction was allowed to proceed until an NCO value of 14 mg/g or less was achieved.

The weight average molecular weight of the obtained urethane resin component was 20,000.

4.5 parts of 2-hydroxyethyl acrylate, which is a polymerizable unsaturated monomer of the acrylic resin component, was further added to the reaction product. A reaction was allowed to proceed until an NCO value of 1 mg/g or less was achieved, and the mixture was cooled to room temperature to obtain an acrylic monomer dilute solution of an acid-group- and terminal-unsaturated-group-containing polyurethane resin.

Stirring was then continued, and 72.7 parts of the graft acrylic resin (II-1) solution obtained in Production Example 1 and 2.0 parts of dimethylethanolamine were added, resulting in neutralization. Water dispersion (phase-inversion emulsification) was performed while suitably adding 112.9 parts of deionized water.

After completion of water dispersion (emulsification), the mixture was heated to 70° C. while stirring. A polymerization initiator solution in which 0.06 parts of VA-057 (trade name, produced by Wako Pure Chemical Industries, Ltd., a polymerization initiator, 2,2'-azobis[N-(2-carboxyethyl)-2-methylpropionamide]) was dissolved in 2.4 parts of deionized water was added dropwise over a period of 30 minutes, and the mixture was stirred for 2 hours. Thus, a polymerization reaction of polymerizable unsaturated groups for the acrylic resin component was performed. Since heat was generated to some extent by polymerization heat during the reaction, the temperature was suitably controlled as necessary.

Thereafter, a polymerization initiator solution in which 0.03 parts of VA-057 was dissolved in 1.2 parts of deionized water was further added as an additional catalyst, and the mixture was stirred for 2 hours while the temperature was maintained, to further allow a reaction to proceed. The mixture was then cooled to room temperature to obtain an aqueous dispersion of acrylic urethane composite resin particles No. 1.

The obtained acrylic urethane composite resin particles No. 1 had a mass solids concentration of 40% and an average particle size of 180 nm (measured with a COULTER N4 (produced by Beckman Coulter, Inc.) submicron particle size distribution analyzer at 20° C. as diluted with deionized water).

Production Examples 12 to 26, 29, 31, and 32

Aqueous dispersions of acrylic urethane composite resin particles Nos. 2 to 16, 19, 21, and 22 were produced in the same manner as in Production Example 11, except that the formulations shown in Table 2 below were used. Table 2 also shows the solids concentrations of the obtained aqueous dispersions of the acrylic urethane composite resin particles and the average particle sizes of the particles.

Table 2 shows the composition ratios of the acrylic resin component and the urethane resin component, based on the total amount, taken as 100, of each resin component.

In addition, the NCO value at the reaction endpoint during the step and the amount of the polymerization initiator were suitably adjusted according to the proportions of the components.

The acrylic urethane composite resin particles Nos. 21 and 22 are for use in Comparative Examples. The acrylic urethane composite resin particles No. 22, which were produced using the graft acrylic resin (II-10) having a weight average molecular weight of 4,000, could not be subjected to tests for a coating composition because they had poor stability at the time of synthesis and contained a lot of agglomerates.

Production Example 27

16.7 parts of ETERNACOLL UH-100, 2.5 parts of dimethylol butanoic acid, 24 parts of n-butyl acrylate, 1.5 parts of ethylene glycol dimethacrylate, and 0.008 parts of butylhydroxytoluene were placed in a reactor equipped with a thermometer, a thermostat, a stirrer, and a reflux condenser. After the mixture was heated to 100° C. while stirring, 10.3 parts of hydrogenated MDI was added dropwise over a period of 30 minutes.

Thereafter, while the temperature was maintained at 100° C., a reaction was allowed to proceed until an NCO value of 14 mg/g or less was achieved.

The weight average molecular weight of the urethane resin component in the obtained solution was 20,000.

0.5 parts of 3,5-dimethylpyrazole was added to the reaction product, and a reaction was allowed to proceed until an NCO value of 7 mg/g or less was achieved. Further, 4.5 parts of 2-hydroxyethyl acrylate was added, and a reaction was allowed to proceed until an NCO value of 1 mg/g or less was achieved. The mixture was cooled to room temperature to obtain an acrylic monomer dilute solution of an acid-group-, terminal-unsaturated-group-, and blocked-isocyanate-group-containing polyurethane resin.

Stirring was then continued, and 72.7 parts of the graft acrylic resin (II-1) solution and 2.0 parts of dimethylethanolamine were added, resulting in neutralization. Water dispersion (phase-inversion emulsification) was performed while suitably adding 112.9 parts of deionized water.

After completion of water dispersion (emulsification), the mixture was heated to 70° C. while stirring. A polymerization initiator solution in which 0.06 parts of VA-057 was dissolved in 2.4 parts of deionized water was added dropwise over a period of 30 minutes, and the mixture was stirred for 2 hours. Since heat was generated to some extent by polymerization heat during this step, the temperature was suitably controlled as necessary.

Thereafter, a polymerization initiator solution in which 0.03 parts of VA-057 was dissolved in 1.2 parts of deionized water was further added, and the mixture was stirred for 2 hours while the temperature was maintained, to further allow a reaction to proceed. The mixture was then cooled to room temperature to obtain an aqueous dispersion of acrylic urethane composite resin particles No. 17.

The obtained acrylic urethane composite resin particles No. 17 had a mass solids concentration of 40% and an average particle size of 180 nm.

Production Example 28

16.3 parts of ETERNACOLL UH-100, 2.5 parts of dimethylol butanoic acid, 24 parts of n-butyl acrylate, 1.5 parts of ethylene glycol dimethacrylate, and 0.008 parts of butylhydroxytoluene were placed in a reactor equipped with a thermometer, a thermostat, a stirrer, and a reflux condenser. After the mixture was heated to 100° C. while stirring, 10.3 parts of hydrogenated MDI was added dropwise over a period of 30 minutes.

Thereafter, while the temperature was maintained at 100° C., a reaction was allowed to proceed until an NCO value of 14 mg/g or less was achieved.

The weight average molecular weight of the urethane resin component in the obtained solution was 20,000.

1.0 part of 3,5-dimethylpyrazole was added to the reaction product. A reaction was allowed to proceed until an NCO value of 1 mg/g or less (substantially 0) was achieved, and the mixture was cooled to room temperature to obtain an acrylic monomer dilute solution of an acid-group- and blocked-isocyanate-group-containing polyurethane resin.

Stirring was then continued, and 4.5 parts of 2-hydroxyethyl acrylate, 72.7 parts of the graft acrylic resin (II-1) solution, and 2.0 parts of dimethylethanolamine were added, resulting in neutralization. Water dispersion (phase-inversion emulsification) was performed while suitably adding 112.9 parts of deionized water.

After completion of water dispersion (emulsification), the mixture was heated to 70° C. while stirring. A polymerization initiator solution in which 0.06 parts of VA-057 was dissolved in 2.4 parts of deionized water was added dropwise over a period of 30 minutes, and the mixture was stirred for 2 hours. Since heat was generated to some extent by polymerization heat during this step, the temperature was suitably controlled as necessary.

Thereafter, a polymerization initiator solution in which 0.03 parts of VA-057 was dissolved in 1.2 parts of deionized water was further added, and the mixture was stirred for 2 hours while the temperature was maintained to further allow a reaction to proceed. The mixture was then cooled to room temperature to obtain an aqueous dispersion of acrylic urethane composite resin particles No. 18.

The obtained acrylic urethane composite resin particles No. 18 had a mass solids concentration of 40% and an average particle size of 170 nm.

As is clear from the synthesis conditions described above, the acrylic resin component and the urethane resin component in the acrylic urethane composite resin particles No. 18 are not grafted together. Thus, the acrylic urethane composite resin particles No. 18 are composite resin particles in which the acrylic resin component and the urethane resin component are not grafted together.

Production Example 30

28.7 parts of ETERNACOLL UH-100, 4.3 parts of dimethylol butanoic acid, 40 parts of n-butyl acrylate, 2.5 parts of ethylene glycol dimethacrylate, and 0.010 parts of butylhydroxytoluene were placed in a reactor equipped with a thermometer, a thermostat, a stirrer, and a reflux condenser. After the mixture was heated to 100° C. while stirring, 17.2 parts of hydrogenated MDI was added dropwise over a period of 30 minutes.

Thereafter, while the temperature was maintained at 100° C., a reaction was allowed to proceed until an NCO value of 14 mg/g or less was achieved.

The weight average molecular weight of the urethane resin component in the obtained solution was 20,000.

7.5 parts of 2-hydroxyethyl acrylate was added to the reaction product. A reaction was allowed to proceed until an NCO value of 1 mg/g or less was achieved, and the mixture was cooled to room temperature to obtain an acrylic monomer dilute solution of an acid-group- and terminal-unsaturated-group-containing polyurethane resin.

Stirring was then continued, and 2.0 parts of dimethylethanolamine and 32.8 parts of diethylene glycol monoethyl ether acetate were added, resulting in neutralization. Water dispersion (phase-inversion emulsification) was performed while suitably adding 112.9 parts of deionized water.

After completion of water dispersion (emulsification), the mixture was heated to 70° C. while stirring. A polymerization initiator solution in which 0.10 parts of VA-057 was dissolved in 2.4 parts of deionized water was added dropwise over a period of 30 minutes, and the mixture was stirred for 2 hours. Since heat was generated to some extent by polymerization heat during this step, the temperature was suitably controlled as necessary.

Thereafter, a polymerization initiator solution in which 0.05 parts of VA-057 was dissolved in 1.2 parts of deionized water was further added, and the mixture was stirred for 2 hours while the temperature was maintained to further allow a reaction to proceed. The mixture was then cooled to room temperature to obtain an aqueous dispersion of acrylic urethane composite resin particles No. 20.

The obtained acrylic urethane composite resin particles No. 20 had a mass solids concentration of 40% and an average particle size of 100 nm. The acrylic urethane composite resin particles No. 20 are for use in Comparative Examples.

The hydroxy value of the acrylic resin component of the acrylic urethane resin (I) shown in Table 2 is a hydroxy value (mg KOH/g) after hydroxy groups were consumed when the hydroxy groups were consumed by, for example, a grafting reaction with the isocyanate groups of the urethane resin component.

TABLE 2

| Production Example No. | | | 11 | 12 | 13 | 14 | 15 | 16 | 17 | 18 | 19 | 20 | 21 |
|---|---|---|---|---|---|---|---|---|---|---|---|---|---|
| Acrylic urethane composite resin particles No. | | | 1 | 2 | 3 | 4 | 5 | 6 | 7 | 8 | 9 | 10 | 11 |
| Acrylic urethane resin (I) | | | | | | | I-1 | | | | I-2 | I-3 | I-4 |
| Urethane resin component (total: 100) | OH component | ETERNACOLL UH-100 | | | | | 57.3 | | | | | | |
| | | 1,6-Hexanediol | | | | | | | | | | | |
| | | Dimethylol butanoic acid | | | | | 8.5 | | | | | | |
| | NCO component | Hydrogenated MDI | | | | | 34.3 | | | | | | |
| | | Isophorone diisocyanate | | | | | | | | | | | |
| | Block component | 3,5-Dimethylpyrazole | | | | | | | | | | | |
| | Weight average molecular weight of urethane resin component | | | | | | 20,000 | | | | | | |
| Percentage of urethane resin component (%) | | | 30 | 40 | | | | | 30 | | | | |
| Acrylic resin component (total: 100) | Other polymerizable unsaturated monomer | n-Butyl acrylate | | | | | 80 | | | | | | |
| | | 2-Ethylhexyl acrylate | | | | | | | | | | 80 | |
| | | Ethyl acrylate | | | | | | | | | | | 70 |
| | | Styrene | | | | | | | | | | | 10 |
| | | Ethylene glycol dimethacrylate | | | | | 5 | | | | | | |
| | Active-hydrogen-atom-containing polymerizable unsaturated monomer | 2-Hydroxyethyl acrylate | | | | | 15 | | | | | | 15 |
| | | Aminopropyl methacrylate | | | | | | | | | 15 | | |
| Percentage of acrylic resin component (%) | | | 30 | 40 | | | | | 30 | | | | |
| Percentage of acrylic urethane resin (I) (solids content) (%) | | | 60 | 80 | | | | | 60 | | | | |
| Hydroxy value of acrylic resin component of acrylic urethane resin (I) | | | | | | | 70 | | | | | 0 | 70 |
| Graft acrylic resin (II) | | | II-1 | | II-2 | II-3 | II-4 | II-5 | II-6 | II-7 | | II-1 | |
| Percentage of graft acrylic resin (II) (solids content) (%) | | | 40 | 20 | | | | | 40 | | | | |
| Average particle size of acrylic urethane composite resin particles (nm) | | | 180 | 160 | 150 | 220 | 120 | 140 | 180 | 170 | 160 | 180 | 200 |
| Solids concentration of acrylic urethane composite resin particles (%) | | | | | | | 40 | | | | | | |

| Production Example No. | | | 22 | 23 | 24 | 25 | 26 | 27 | 28 | 29 | 30 | 31 | 32 |
|---|---|---|---|---|---|---|---|---|---|---|---|---|---|
| Acrylic urethane composite resin particles No. | | | 12 | 13 | 14 | 15 | 16 | 17 | 18 | 19 | 20 | 21 | 22 |
| Acrylic urethane resin (I) | | | I-5 | I-6 | I-7 | I-8 | I-9 | I-10 | I-11 | I-12 | | I-1 | |
| Urethane resin component (total: 100) | OH component | ETERNACOLL UH-100 | 57.3 | | | 60.0 | 56.2 | 55.7 | 54.2 | 54.0 | | 57.3 | |
| | | 1,6-Hexanediol | | | | | | | | 4.0 | | | |
| | | Dimethylol butanoic acid | | | | 8.5 | | | | 8.0 | | 8.5 | |
| | NCO component | Hydrogenated MDI | 34.3 | | | 31.5 | 35.3 | 34.2 | 34.1 | | | 34.3 | |
| | | Isophorone diisocyanate | | | | | | | | 34.0 | | | |
| | Block component | 3,5-Dimethylpyrazole | | | | | | 1.6 | 3.2 | | | | |
| | Weight average molecular weight of urethane resin component | | 20,000 | 50000 | 10000 | | 20,000 | | | | | 20,000 | |

TABLE 2-continued

| | | | | | | | | | | | | | |
|---|---|---|---|---|---|---|---|---|---|---|---|---|---|
| Percentage of urethane resin component (%) | | | | | | | 30 | | | | 50 | 30 | |
| Acrylic resin component (total: 100) | Other polymerizable unsaturated monomer | n-Butyl acrylate | 94.9 | 85 | 75 | | 80 | | | | 80 | | |
| | | 2-Ethylhexyl acrylate | | | | | | | | | | | |
| | | Ethyl acrylate | | | | | | | | | | | |
| | | Styrene | | | | | | | | | | | |
| | | Ethylene glycol dimethacrylate | 5 | | 10 | | 5 | | | | 5 | | |
| | Active-hydrogen-atom-containing polymerizable unsaturated monomer | 2-Hydroxyethyl acrylate | 0.1 | | | | 15 | | | | 15 | | |
| | | Aminopropyl methacrylate | | | | | | | | | | | |
| Percentage of acrylic resin component (%) | | | | | | | 30 | | | | 50 | 30 | |
| Percentage of acrylic urethane resin (I) (solids content) (%) | | | | | | | 60 | | | | 100 | 60 | |
| Hydroxy value of acrylic resin component of acrylic urethane resin (I) | | | 0 | 70 | 72 | 69 | 72 | 73 | 70 | | 70 | | |
| Graft acrylic resin (II) | | | II-8 | | | | II-1 | | | | Not contained | II-5 | II-10 |
| Percentage of graft acrylic resin (II) (solids content) (%) | | | | | | | 40 | | | | 0 | 40 | |
| Average particle size of acrylic urethane composite resin particles (nm) | | | 220 | 190 | 170 | 190 | 150 | 180 | 170 | 190 | 100 | 250 | — |
| Solids concentration of acrylic urethane composite resin particles (%) | | | | | | | | 40 | | | | | |

Production of Reactive Group-Containing Resin (B)

Production of Hydroxy-Containing Polyester Resin (B1)

Production Example 33

174 parts of trimethylolpropane, 327 parts of neopentyl glycol, 352 parts of adipic acid, 109 parts of isophthalic acid, and 101 parts of 1,2-cyclohexanedicarboxylic acid anhydride were placed in a reactor equipped with a thermometer, a thermostat, a stirrer, a reflux condenser, and a water separator, and the mixture was heated from 160° C. to 230° C. over a period of 3 hours. While the resulting condensation water was distilled off by using the water separator and the temperature was maintained at 230° C., a reaction was allowed to proceed until an acid value of 3 mg KOH/g or less was achieved. 59 parts of trimellitic anhydride was added to the reaction product, and an addition reaction was conducted at 170° C. for 30 minutes. The resulting product was cooled to 50° C. or lower, and neutralized by adding an equivalent of 2-(dimethylamino)ethanol per acid group. Subsequently, deionized water was gradually added to obtain a hydroxy-containing polyester resin (B1) solution having a solids concentration of 45% and a pH of 7.2. The obtained hydroxy-containing polyester resin had an acid value of 35 mg KOH/g, a hydroxy value of 128 mg KOH/g, and a number average molecular weight of 1,480.

Production of Hydroxy-Containing Acrylic Resin (B2)

Production Example 34

30 parts of propylene glycol monopropyl ether was placed in a reactor equipped with a thermometer, a thermostat, a stirrer, a reflux condenser, a nitrogen inlet tube, and a dropping funnel, and heated to 85° C. Subsequently, a mixture of 6 parts of styrene, 30 parts of methyl methacrylate, 25 parts of n-butyl acrylate, 20 parts of 2-ethylhexyl acrylate, 13 parts of 4-hydroxybutyl acrylate, 6 parts of acrylic acid, 10 parts of propylene glycol monopropyl ether, and 2 parts of 2,2'-azobis(2,4-dimethylvaleronitrile) was added dropwise to the flask over a period of 4 hours. After completion of the dropwise addition, the mixture was aged for 1 hour. Subsequently, a mixture of 5 parts of propylene glycol monopropyl ether and 1 part of 2,2'-azobis(2,4-dimethylvaleronitrile) was further added dropwise to the flask over a period of 1 hour. After completion of the dropwise addition, the mixture was aged for 1 hour. 7.4 parts of 2-(dimethylamino)ethanol was further added for neutralization, and deionized water was gradually added to obtain a hydroxy-containing acrylic resin (B2) solution having a solids concentration of 40%. The obtained hydroxy-containing acrylic resin had an acid value of 47 mg KOH/g, a hydroxy value of 51 mg KOH/g, and a weight average molecular weight of 50,000.

Production of Hydroxy-Containing Acrylic Resin (B3)

Production Example 35

145 parts of deionized water and 1.2 parts of Newcol 562SF (see note 1) were placed in a reactor equipped with a thermometer, a thermostat, a stirrer, a reflux condenser, and a dropping funnel, mixed by stirring in a nitrogen stream, and heated to 80° C. Subsequently, 1% of the total amount of the monomer emulsion 1 described below and 5.2 parts of 3% ammonium persulfate aqueous solution were introduced into the reactor, and maintained at 80° C. for 15 minutes. The remaining monomer emulsion 1 was then added dropwise over a period of 3 hours to the reactor. After completion of the dropwise addition, the mixture was aged for 1 hour. Monomer emulsion 2 described below was then added dropwise over a period of 2 hours, and the mixture was aged for 1 hour. Thereafter, while 89 parts of 1.5% dimethylethanolamine aqueous solution was gradually added to the reactor, the mixture was cooled to 30° C. and filtered through a 100-mesh nylon cloth to obtain a hydroxy-containing acrylic resin (B3) (solids content: 25.2%) having an average particle size of 100 nm, an acid value of 30.7 mg KOH/g, and a hydroxy value of 22.1 mg KOH/g.

Note 1: Newcol 562SF: produced by Nippon Nyukazai Co., Ltd., trade name, ammonium polyoxyethylenealkylbenzenesulfonate, active ingredient: 60%

Monomer emulsion 1: 94.3 parts of deionized water, 17 parts of methyl methacrylate, 80 parts of n-butyl acrylate, 3 parts of allyl methacrylate, and 1.2 parts of Newcol 562SF were mixed by stirring to obtain monomer emulsion 1.

Monomer emulsion 2: 39 parts of deionized water, 15.4 parts of methyl methacrylate, 2.9 parts of n-butyl acrylate, 5.9 parts of hydroxyethyl acrylate, 5.1 parts of methacrylic acid, and 0.5 parts of Newcol 562SF were mixed by stirring to obtain monomer emulsion 2.

Production of Reactive Group-Containing Resins (B4) to (B6)

Production Example 36

36 parts of deionized water and 0.36 parts of Newcol 707SF (produced by Nippon Nyukazai Co., Ltd., an anionic surfactant, nonvolatile content: 30%) were placed in a reactor equipped with a thermometer, a thermostat, a stirrer, a reflux condenser, and a dropping funnel, mixed by stirring in a nitrogen stream, and heated to 82° C. 0.1 parts of ammonium persulfate was then added. Fifteen minutes after the addition, a pre-emulsion of the composition described below was added dropwise over a period of 3 hours.

Composition of Pre-Emulsion

Deionized water: 52 parts, diacetone acrylamide: 5 parts, acrylic acid: 0.5 parts, styrene: 10 parts, methyl methacrylate: 32.8 parts, ethyl acrylate: 27 parts, n-butyl acrylate: 24.7 parts, Newcol 707SF: 9.7 parts, ammonium persulfate: 0.2 parts Thirty minutes after completion of the dropwise addition, an aqueous solution in which 0.1 parts of ammonium persulfate was dissolved in 1.2 parts of deionized water was added dropwise over a period of 30 minutes. Subsequently, the mixture was further aged for 2 hours, cooled to 40° C., and then adjusted to a pH of 8.5 with aqueous ammonia to obtain a reactive group-containing resin (B4) dispersion (solids content: 51.5%).

Production Example 37

30 parts of deionized water and 0.1 parts of Newcol 707SF were placed in a reactor equipped with a thermometer, a thermostat, a stirrer, a reflux condenser, and a dropping funnel, mixed by stirring in a nitrogen stream, and heated to 85° C. A 3 mass % portion of pre-emulsion 1 of the composition described below and a 25 mass % portion of the ammonium persulfate aqueous solution described below were added thereto, and the mixture was stirred.

Twenty minutes after the addition, the remaining pre-emulsion 1 and a 35 mass % portion of the ammonium persulfate aqueous solution described below were added dropwise over a period of 3 hours.

Composition of Pre-Emulsion 1

Deionized water: 27 parts, styrene: 9.8 parts, methyl methacrylate: 19.5 parts, n-butyl acrylate: 30.8 parts, 2-ethylhexyl acrylate: 9.8 parts, acrylic acid: 0.14 parts, Newcol 707SF: 4.62 parts Ammonium Persulfate Aqueous Solution Ammonium persulfate: 0.5 parts, deionized water: 10 parts After completion of the dropwise addition, the mixture was further maintained at 85° C. for 1 hour, and the pre-emulsion 2 described below and a 15% portion of the ammonium persulfate aqueous solution mentioned above were added dropwise thereto over a period of 1 hour.

Composition of pre-emulsion 2

Deionized water: 11.5 parts, styrene: 4.2 parts, methyl methacrylate: 6.8 parts, n-butyl acrylate: 13.2 parts, 2-ethylhexyl acrylate: 4.2 parts, acrylic acid: 0.06 parts, diacetone acrylamide: 1.5 parts, Newcol 707SF: 2.0 parts After completion of the dropwise addition, the mixture was further maintained at 85° C. for 2 hours, cooled to 40° C., and adjusted to a pH of 8.5 with aqueous ammonia to obtain a reactive group-containing resin (B5) dispersion (solids concentration: 55%).

Production Example 38

55 parts of deionized water and 0.15 parts of sodium dodecylbenzenesulfonate were placed in a reactor equipped with a thermometer, a thermostat, a stirrer, a reflux condenser, and a dropping funnel, mixed by stirring in a nitrogen stream and heated to 82° C. Pre-emulsion 1 of the composition described below was added dropwise thereto over a period of 3 hours.

Composition of Pre-Emulsion 1

Deionized water: 40 parts, sodium dodecylbenzenesulfonate: 3 parts, ammonium persulfate: 0.15 parts, cyclohexyl methacrylate: 20 parts, methyl methacrylate: 10 parts, n-butyl acrylate: 29.6 parts, n-butyl methacrylate: 9 parts, vinyltrimethoxysilane: 0.7 parts, and methacrylic acid: 0.7 parts After completion of the dropwise addition of pre-emulsion 1, pre-emulsion 2 of the composition described below was added dropwise to the mixture over a period of 1 hour. The resulting mixture was aged at 82° C. for 2 hours, cooled to 40° C., and then adjusted to a pH of 7.5 with aqueous ammonia to obtain a reactive group-containing resin (B6) dispersion (solids concentration: 47.7%, average particle size: 130 nm).

Pre-Emulsion 2

Deionized water: 18 parts, sodium dodecylbenzenesulfonate: 1.5 parts, ammonium persulfate: 0.05 parts, cyclohexyl methacrylate: 15 parts, methyl methacrylate: 10 parts, n-butyl acrylate: 2 parts, n-butyl methacrylate: 2.4 parts, vinyltrimethoxysilane: 0.3 parts, and methacrylic acid: 0.3 parts Production of Aqueous Coating Composition (Aqueous Intermediate Coating Composition)

Example 1

56 parts of the hydroxy-containing polyester resin (B1) solution obtained in Production Example 33 (resin solids: 25 parts), 60 parts of JR-806 (trade name, produced by Tayca Corporation, rutile titanium dioxide), 1 part of Carbon MA-100 (trade name, produced by Mitsubishi Chemical Corporation, carbon black), 15 parts of Bariace B-35 (trade name, produced by Sakai Chemical Industry Co., Ltd., barium sulfate powder, average primary particle size: 0.5 μm), 3 parts of MICRO ACE S-3 (trade name, produced by Nippon Talc Co., Ltd., talc powder, average primary particle size: 4.8 μm), and 5 parts of deionized water were mixed. The mixture was adjusted to a pH of 8.0 with 2-(dimethylamino)ethanol, and then dispersed using a paint shaker for 30 minutes to obtain a pigment dispersion paste.

Subsequently, 140 parts of the obtained pigment dispersion paste, 29 parts of the hydroxy-containing polyester resin (B1) solution obtained in Production Example 33

(resin solids: 13 parts), 25 parts of the hydroxy-containing acrylic resin (B2) solution obtained in Production Example 34 (resin solids: 10 parts), 40 parts of melamine resin (C1) (methyl-butyl mixed etherified melamine resin, solids content: 80%, weight average molecular weight: 800) (resin solids: 32 parts), and 50 parts of the aqueous dispersion of the acrylic urethane composite resin particles No. 1 obtained in Production Example 11 (resin solids: 20 parts) were uniformly mixed.

Thereafter, UH-752 (trade name, produced by ADEKA Co., Ltd., urethane associative thickener), 2-(dimethylamino)ethanol, and deionized water were added to the resulting mixture to obtain an aqueous intermediate coating composition No. 1 having a pH of 8.0, a solids concentration of 48%, and a viscosity of 30 seconds as measured with Ford cup No. 4 at 20° C.

Examples 2 to 19 and Comparative Examples 1 and 2

Aqueous intermediate coating compositions Nos. 2 to 21 were obtained in the same manner as in Example 1, except that the formulations shown in Table 3 below were used. The compositions had a pH of 8.0, a solids concentration of 48 mass %, and a viscosity of 30 seconds as measured with Ford cup No. 4 at 20° C.

The aqueous intermediate coating compositions Nos. 20 and 21 are for use in Comparative Examples.

Bayhydur VPLS2310 in Table 3 is a blocked polyisocyanate compound (trade name, produced by Sumika Bayer Urethane Co., Ltd., solids content: 38%).

The following evaluation tests were performed for the aqueous intermediate coating compositions Nos. 1 to 21 obtained in Examples 1 to 19 and Comparative Examples 1 to 2. Table 3 shows the evaluation results.

Storage stability: 200 g of each of the aqueous intermediate coating compositions was individually placed in sealable glass bottles and stored in a thermostatic room at 30° C.

Thereafter, the aqueous intermediate coating compositions were taken out monthly to check for the presence or absence of coagulation and the viscosity, and a record was made when there was coagulation or when the change in the viscosity was ±30% or more.

In the evaluation data of Table 3, the time from the start of the test to the deterioration state described above is expressed on a monthly basis. For example, "2M" indicates two months after the start of the test, and "3M<" indicates that the coating composition is not in the deterioration state even three months after the start of the test, and has excellent storage stability.

Washability from a coating gun: Each aqueous intermediate coating composition was ejected for 10 seconds using a G1 COPES BELL automatic coater produced by ABB (rotation speed: 30,000/min, shaping air pressure: 4.0 kg/cm$^2$, paint flow rate: 200 cc/min), and allowed to stand for 50 seconds. This procedure was repeated 10 times, and cleaning water (water/ethylene glycol butyl ether/isopropanol/dimethylethanolamine=90/5/4/1 (mass ratio)) was ejected for 2 seconds. The condition of the coating composition remaining on the groove of the bell was evaluated according to the following criteria.
A: No coating composition remained on the groove of the bell.
B: A small amount of the coating composition remained on the groove of the bell.
C: A considerable amount of the coating composition remained on the groove of the bell.

Test plates were prepared as described below, and finished appearance (smoothness and distinctness of image) and water resistance were evaluated.

Preparation of Test Substrates

Electron GT-10 (trade name, produced by Kansai Paint Co., Ltd., a cationic electrodeposition coating composition) was applied to zinc phosphated cold-rolled steel plates by electrodeposition to a film thickness of 20 μm when dried, and cured by heating at 170° C. for 30 minutes to prepare test substrates.

Each aqueous intermediate coating composition was individually electrostatically applied to the test substrates to a film thickness of 30 μm (when cured) using a rotary atomizing electrostatic coating apparatus and allowed to stand for 5 minutes. After preheating at 80° C. for 3 minutes and heating at 140° C. for 30 minutes, intermediate coating films were formed. WBC-713T No. 176 (trade name, produced by Kansai Paint Co., Ltd., an acrylic melamine resin-based aqueous base coating composition, coating color: silver) was further electrostatically applied to the intermediate coating films to a film thickness of 15 μm (when cured) using a rotary atomizing electrostatic coating apparatus to form base coating films, and the substrates were then allowed to stand for 3 minutes. After preheating at 80° C. for 3 minutes, Magicron KING-1210 (trade name, produced by Kansai Paint Co., Ltd., acrylic resin solvent-based top clear coating composition) was electrostatically applied to the uncured base coating films to a film thickness of 35 μm (when cured), to form clear coating films. The thus-coated substrates were allowed to stand for 7 minutes and then heated at 140° C. for 30 minutes to simultaneously cure the base coating films and the clear coating films, thereby preparing test plates.

Smoothness: Smoothness was evaluated based on We value measured using Wave Scan DOI (trade name, produced by BYK Gardner). The We value is an index of the amplitude of surface roughness at a wavelength of about 1 to 3 mm. A smaller We value indicates greater smoothness of the coated surface.

Distinctness of image: Distinctness of image was evaluated based on Wb value measured using Wave Scan DOI (trade name, produced by BYK Gardner). The Wb value is an index of the amplitude of surface roughness at a wavelength of about 0.3 to 1 mm. A smaller Wb value indicates a higher distinctness of image of the coated surface.

Water resistance: Each test plate was immersed in warm water at 40° C. for 240 hours. After being removed from the water, the test plate was dried at 20° C. for 12 hours. Then, cross-cuts reaching the substrate were made in the multilayer coating film of the test plate using a utility knife to form a grid of 100 squares (2 mm×2 mm). Subsequently, adhesive cellophane tape was applied to the surface of the grid portion, and the tape was peeled off rapidly at 20° C. Then, the number of squares of the coating film remaining and the condition were checked, and water resistance was evaluated according to the following criteria.

S: 100 squares of the coating film remained, and no small edge chipping of the coating film occurred at the edge of the cut made with the utility knife.
A: 100 squares of the coating film remained, but small edge chipping of the coating film occurred at the edge of the cut made with the utility knife.
B: 90 to 99 squares of the coating film remained.
C: The number of squares of the coating film remaining was 89 or less.

TABLE 3

|  |  |  |  | Example 1 | 2 | 3 | 4 | 5 | 6 | 7 | 8 | 9 | 10 | 11 |
|---|---|---|---|---|---|---|---|---|---|---|---|---|---|---|
| Aqueous intermediate coating composition No. |  |  |  | 1 | 2 | 3 | 4 | 5 | 6 | 7 | 8 | 9 | 10 | 11 |
| Pigment paste | Hydroxy-containing polyester resin (B1) solution |  |  | 56 | 56 | 56 | 56 | 56 | 56 | 56 | 56 | 56 | 56 | 56 |
|  | Pigment | Coloring pigment | JR-806 | 60 | 60 | 60 | 60 | 60 | 60 | 60 | 60 | 60 | 60 | 60 |
|  |  |  | MA-100 | 1 | 1 | 1 | 1 | 1 | 1 | 1 | 1 | 1 | 1 | 1 |
|  |  | Extender pigment | Bariace B-35 | 15 | 15 | 15 | 15 | 15 | 15 | 15 | 15 | 15 | 15 | 15 |
|  |  |  | MICRO ACE S-3 | 3 | 3 | 3 | 3 | 3 | 3 | 3 | 3 | 3 | 3 | 3 |
| Reactive group-containing resin (B) | Hydroxy-containing polyester resin (B1) solution |  |  | 29 | 29 | 29 | 29 | 29 | 29 | 29 | 29 | 29 | 29 | 29 |
|  | Hydroxy-containing acrylic resin (B2) solution |  |  | 25 | 25 | 25 | 25 | 25 | 25 | 25 | 25 | 25 | 25 | 25 |
| Crosslinking agent (C) | Melamine resin (C1) |  |  | 40 |  | 40 | 40 | 40 | 40 | 40 | 40 | 40 | 40 | 40 |
|  | Blocked polyisocyanate compound | Bayhydur VPLS2310 |  |  | 84 |  |  |  |  |  |  |  |  |  |
| Aqueous dispersion of acrylic urethane composite resin particles (A) |  |  | No. | 1 | 1 | 2 | 3 | 4 | 5 | 6 | 7 | 8 | 9 | 10 |
|  |  |  | Amount | 50 | 50 | 50 | 50 | 50 | 50 | 50 | 50 | 50 | 50 | 50 |
| Storage stability |  |  |  | 3M< | 3M< | 3M< | 2M | 3M< | 3M< | 3M< | 3M< | 3M< | 3M< | 3M< |
| Washability from a coating gun |  |  |  | A | A | A | A | A | A | A | A | A | A | A |
| Smoothness |  |  |  | 25.2 | 18.5 | 26.2 | 28.5 | 26.8 | 25.4 | 24.9 | 25.5 | 26.1 | 26.4 | 23.8 |
| Distinctness of image |  |  |  | 24.3 | 19.3 | 24.7 | 26.9 | 25.3 | 24.5 | 24.1 | 24.7 | 24.8 | 25.2 | 22.5 |
| Water resistance |  |  |  | S | S | A | A | S | S | S | S | S | S | S |

|  |  |  |  | Example 12 | 13 | 14 | 15 | 16 | 17 | 18 | 19 | Comparative Example 1 | 2 |
|---|---|---|---|---|---|---|---|---|---|---|---|---|---|
| Aqueous intermediate coating composition No. |  |  |  | 12 | 13 | 14 | 15 | 16 | 17 | 18 | 19 | 20 | 21 |
| Pigment paste | Hydroxy-containing polyester resin (B1) solution |  |  | 56 | 56 | 56 | 56 | 56 | 56 | 56 | 56 | 56 | 56 |
|  | Pigment | Coloring pigment | JR-806 | 60 | 60 | 60 | 60 | 60 | 60 | 60 | 60 | 60 | 60 |
|  |  |  | MA-100 | 1 | 1 | 1 | 1 | I-1 | 1 | 1 | 1 | 1 | 1 |
|  |  | Extender pigment | Bariace B-35 | 15 | 15 | 15 | 15 | 15 | 15 | 15 | 15 | 15 | 15 |
|  |  |  | MICRO ACE S-3 | 3 | 3 | 3 | 3 | 3 | 3 | 3 | 3 | 3 | 3 |
| Reactive group-containing resin (B) | Hydroxy-containing polyester resin (B1) solution |  |  | 29 | 29 | 29 | 29 | 29 | 29 | 29 | 29 | 29 | 29 |
|  | Hydroxy-containing acrylic resin (B2) solution |  |  | 25 | 25 | 25 | 25 | 25 | 25 | 25 | 25 | 25 | 25 |
| Crosslinking agent (C) | Melamine resin (C1) |  |  | 40 | 40 | 40 | 40 | 40 | 40 | 40 | 40 | 40 | 40 |
|  | Blocked polyisocyanate compound | Bayhydur VPLS2310 |  |  |  |  |  |  |  |  |  |  |  |
| Aqueous dispersion of acrylic urethane composite resin particles (A) |  |  | No. | 11 | 13 | 14 | 15 | 16 | 17 | 18 | 19 | 20 | 21 |
|  |  |  | Amount | 50 | 50 | 50 | 50 | 50 | 50 | 50 | 50 | 50 | 50 |
| Storage stability |  |  |  | 3M< | 3M< | 3M< | 3M< | 3M< | 3M< | 2M | 3M< | 1M | 1M |
| Washability from a coating gun |  |  |  | A | A | A | A | A | A | A | A | C | B |
| Smoothness |  |  |  | 27.1 | 24.0 | 29.2 | 28.7 | 22.8 | 24.6 | 24.8 | 27.8 | 39.7 | 34.5 |
| Distinctness of image |  |  |  | 25.9 | 22.6 | 28.3 | 27.1 | 21.6 | 23.0 | 23.7 | 26.2 | 38.3 | 33.8 |
| Water resistance |  |  |  | S | A | S | S | A | S | A | S | B | B |

Production of Aqueous Coating Composition
(Aqueous Base Coating Composition for Topcoats)

Example 20

While stirring, 37.5 parts of Cymel 325 (produced by Nihon Cytec Industries Inc., a methyl-butyl mixed etherified melamine resin, solids content: 80%), 79.4 parts (resin solids: 20 parts) of the hydroxy-containing acrylic resin (B3) obtained in Production Example 35 (solids content: 25.2%), and 50 parts (resin solids: 20 parts) of the aqueous dispersion of the acrylic urethane composite resin particles No. 1 obtained in Production Example 11 were uniformly mixed with 66.7 parts (resin solids: 30 parts) of the hydroxy-containing polyester resin (B1) solution obtained in Production Example 33.

Thereafter, aluminum paste GX180A (produced by Asahi Kasei Corporation, an aluminum flake paste) was added while stirring in an amount such that the amount of aluminum pigment component was 20 parts, followed by mixing and dispersing. Primal ASE-60 (produced by Rohm and Haas, an acrylic emulsion type alkali thickener), dimethylethanolamine, and deionized water were further added to obtain an aqueous base coating composition for topcoats No. 1 having a pH of 8.0, a solids concentration of 25 mass %, and a viscosity of 40 seconds as measured with Ford cup No. 4 at 20° C.

Examples 21 to 38 and Comparative Examples 3 and 4

Aqueous base coating compositions for topcoats Nos. 2 to 21 were obtained in the same manner as in Example 20, except that the formulations shown in Table 4 below were used. The compositions had a pH of 8.0, a solids concentration of 25 mass %, and a viscosity of 40 seconds as measured with Ford cup No. 4 at 20° C.

The aqueous base coating compositions for topcoats Nos. 20 and 21 are for use in Comparative Examples.

Bayhydur VPLS2310 in Table 4 is a blocked polyisocyanate compound (trade name, produced by Sumika Bayer Urethane Co., Ltd., solids content: 38%).

The following evaluation tests were performed for the aqueous base coating compositions for topcoats Nos. 1 to 21 obtained in Examples 20 to 38 and Comparative Examples 3 and 4. Table 4 shows the evaluation results.

The tests for storage stability and washability from a coating gun were performed in the same manner as in those performed for the aqueous intermediate coating compositions described above.

Test plates were prepared as described below, and finished appearance (smoothness and distinctness of image) and water resistance were evaluated.

WP-307T (trade name, produce by Kansai Paint Co., Ltd., a polyester melamine resin-based aqueous intermediate coating composition) was electrostatically applied to test substrates prepared in the same manner as for the aqueous intermediate coating compositions described above to a film thickness of 30 μm (when cured) using a rotary atomizing electrostatic coating apparatus and allowed to stand for 5 minutes. After preheating at 80° C. for 3 minutes and heating at 140° C. for 30 minutes, intermediate coating films were formed.

Further, each aqueous base coating composition for topcoats was individually electrostatically applied to the intermediate coating films to a film thickness of 15 μm (when cured) using a rotary atomizing electrostatic coating apparatus to form base coating films, and the substrates were allowed to stand for 3 minutes. After preheating at 80° C. for 3 minutes, Magicron KINO-1210 (trade name, produce by Kansai Paint Co., Ltd., an acrylic resin solvent-based top clear coating composition) was electrostatically applied to the uncured base coating films to a film thickness of 35 μm (when cured) to form clear coating films. The thus-coated substrates were allowed to stand for 7 minutes and then heated at 140° C. for 30 minutes to simultaneously cure the base coating films and the clear coating films, thereby preparing test plates.

The obtained test plates were evaluated for smoothness, distinctness of image, and water resistance in the same manner as for the aqueous intermediate coating compositions described above.

TABLE 4

| | | | Example | | | | | | | | | | | |
|---|---|---|---|---|---|---|---|---|---|---|---|---|---|---|
| | | | 20 | 21 | 22 | 23 | 24 | 25 | 26 | 27 | 28 | 29 | 30 |
| Aqueous base coating composition for topcoats No. | | | 1 | 2 | 3 | 4 | 5 | 6 | 7 | 8 | 9 | 10 | 11 |
| Reactive group-containing resin (B) | Hydroxy-containing polyester resin (B1) solution | | 66.7 | 66.7 | 66.7 | 66.7 | 66.7 | 66.7 | 66.7 | 66.7 | 66.7 | 66.7 | 66.7 |
| | Hydroxy-containing acrylic resin (B3) solution | | 79.4 | 79.4 | 79.4 | 79.4 | 79.4 | 79.4 | 79.4 | 79.4 | 79.4 | 79.4 | 79.4 |
| Crosslinking agent (C) | Cymel 325 | | 37.5 | | 37.5 | 37.5 | 37.5 | 37.5 | 37.5 | 37.5 | 37.5 | 37.5 | 37.5 |
| | Blocked polyisocyanate compound | Bayhydur VPLS2310 | | 78.9 | | | | | | | | | |
| Aqueous dispersion of acrylic urethane composite resin particles (A) | | No. | 1 | 1 | 2 | 3 | 4 | 5 | 6 | 7 | 8 | 9 | 10 |
| | | Amount | 50 | 50 | 50 | 50 | 50 | 50 | 50 | 50 | 50 | 50 | 50 |
| GX180A | | | 20 | 20 | 20 | 20 | 20 | 20 | 20 | 20 | 20 | 20 | 20 |
| Storage stability | | | 3M< | 3M< | 3M< | 2M | 3M< | 3M< | 3M< | 3M< | 3M< | 3M< | 3M< |
| Washability from a coating gun | | | A | A | A | A | A | A | A | A | A | A | A |
| Smoothness | | | 26.5 | 19.4 | 27.5 | 29.9 | 28.1 | 26.7 | 26.1 | 26.8 | 27.4 | 27.7 | 25 |
| Distinctness of image | | | 25.5 | 20.3 | 25.9 | 28.2 | 26.6 | 25.7 | 25.3 | 25.9 | 26 | 26.5 | 23.6 |
| Water resistance | | | S | S | A | A | S | S | S | S | S | S | S |

| | | | Example | | | | | | | | Comparative Example | |
|---|---|---|---|---|---|---|---|---|---|---|---|---|
| | | | 31 | 32 | 33 | 34 | 35 | 36 | 37 | 38 | 3 | 4 |
| Aqueous base coating composition for topcoats No. | | | 12 | 13 | 14 | 15 | 16 | 17 | 18 | 19 | 20 | 21 |
| Reactive group-containing resin (B) | Hydroxy-containing polyester resin (B1) solution | | 66.7 | 66.7 | 66.7 | 66.7 | 66.7 | 66.7 | 66.7 | 66.7 | 66.7 | 66.7 |
| | Hydroxy-containing acrylic resin (B3) solution | | 79.4 | 79.4 | 79.4 | 79.4 | 79.4 | 79.4 | 79.4 | 79.4 | 79.4 | 79.4 |
| Crosslinking agent (C) | Cymel 325 | | 37.5 | 37.5 | 37.5 | 37.5 | I-1 | 37.5 | 37.5 | 37.5 | 37.5 | 37.5 |
| | Blocked polyisocyanate compound | Bayhydur VPLS2310 | | | | | | | | | | |
| Aqueous dispersion of acrylic urethane composite resin particles (A) | | No. | 11 | 13 | 14 | 15 | 16 | 17 | 18 | 19 | 20 | 21 |
| | | Amount | 50 | 50 | 50 | 50 | 50 | 50 | 50 | 50 | 50 | 50 |
| GX180A | | | 20 | 20 | 20 | 20 | 20 | 20 | 20 | 20 | 20 | 20 |
| Storage stability | | | 3M< | 3M< | 3M< | 3M< | 3M< | 3M< | 2M | 3M< | 1M | 1M |
| Washability from a coating gun | | | A | A | A | A | A | A | A | A | C | B |
| Smoothness | | | 28.5 | 25.2 | 30.7 | 30.1 | 23.9 | 25.8 | 26 | 29.2 | 41.7 | 36.2 |
| Distinctness of image | | | 27.2 | 23.7 | 29.7 | 28.5 | 22.7 | 24.2 | 24.9 | 27.5 | 40.2 | 35.5 |
| Water resistance | | | S | A | S | S | A | S | A | S | B | B |

Production of Aqueous Coating Composition
(Peelable Aqueous Coating Composition)

Examples 39 and 40 and Comparative Examples 5 and 6

1,286 parts of the reactive group-containing resin (B4) dispersion obtained in Production Example 36 (solids concentration: 51.5%) was placed in a stirring device and heated to 45° C. 29.9 parts of a solution in which 4.9 parts of adipic acid dihydrazide was dissolved in 25 parts of deionized water was added thereto, and the mixture was adjusted to a pH of 8.5 with aqueous ammonia, thereby obtaining a crosslinkable resin dispersion (X) (solids content: 50.7%).

The crosslinkable resin dispersion (X), the peel auxiliary (Y) described below, and optionally an aqueous dispersion of acrylic urethane composite resin particles (A), were mixed by stirring in the amounts shown in Table 5 (solids content) to obtain peelable aqueous coating compositions Nos. 1 to 4.

Peel auxiliary (Y): 2 parts of polyoxyethylene sorbitan monooleate and 68 parts of water were added to 30 parts of modified silicone TSF4445 (produced by Toshiba Silicone Co., Ltd., polyether-modified silicone oil), and the mixture was stirred well to obtain a peel auxiliary (Y) having a solids content of 30%.

Polyoxyalkylene alkylphenyl ether and perfluoroalkylamine oxide were, if necessary, added to the above aqueous coating compositions to adjust the viscosity and surface tension as shown in Table 5. Each of the resulting coating compositions was individually applied to coated plates (glass transition temperature of the cured coating film: 82° C.) by spraying and dried at 70° C. for 10 minutes to form peelable coating films having a film thickness of 50 to 70 µm. The coated plates were prepared by subjecting mild steel plates (thickness: 0.7 mm) surface-treated with Palbond 3050 (trade name, a zinc phosphate-based surface treatment agent, produced by Nihon Parkerizing Co., Ltd.) to bake coating with an aminoalkyd resin coating composition (produced by Kansai Paint Co., Ltd., trade name: Amilac) at 140° C. for 30 minutes. Table 5 also shows the performance test results of these films. The test and evaluation methods are as described below.

TABLE 5

Proportions of the components of the coating composition and performance test results

|  | Example | | Comparative Example | |
| --- | --- | --- | --- | --- |
|  | 39 | 40 | 5 | 6 |
| Peelable aqueous coating composition No. | 1 | 2 | 3 | 4 |
| Crosslinkable resin dispersion (X) | 80 | 80 | 100 | 80 |
| Acrylic urethane composite resin particles No. 7 | 20 | | | |
| Acrylic urethane composite resin particles No. 12 | | 20 | | |
| Acrylic urethane composite resin particles No. 20 | | | | 20 |
| Peel auxiliary (Y) | 2 | 2 | 2 | 2 |
| Viscosity (Pa · s) | 0.9 | 0.8 | 0.7 | 0.8 |
| Surface tension (mN/m) | 30 | 31 | 35 | 32 |
| Peelability | A | A | A | A |
| Accelerated weather resistance | A | A | B | B |
| Protection properties (acid resistance) | A | S | B | B |
| Film strength (kgf/cm$^2$) | 180 | 170 | 120 | 150 |
| Film elongation (%) | 410 | 390 | 360 | 380 |

Viscosity: The viscosity was measured using a B-type viscometer produced by Tokyo Keiki Inc. The measurement conditions were as follows: coating liquid temperature: 20° C., rotor rotation speed: 60 rpm.

Surface tension: The surface tension was measured using a Kyowa CBVP-type tensiometer produced by Kyowa Chemical Industry Co., Ltd.

Peelability: After film formation, the film of each peelable aqueous coating composition on the test plate was allowed to stand at 20° C. for one day and peeled off from the edge portion at a speed of 1 m/30 s to examine peelability. The peelability was evaluated according to the following criteria.

A: Easily peelable
B: Peelable but not easily
C: Not peelable

Accelerated weather resistance: The weather resistance was determined by a QUV accelerated exposure test using an accelerated weathering tester produced by Q Panel. UV light irradiation of 16H/70° C. and water condensation of 8H/50° C. were regarded as one cycle. The test was performed for 960 hours (40 cycles). After each film was peeled off in the same manner as in the test for peelability described above, swelling of the aminoalkyd coating film, which is a substrate, and the presence or absence of other abnormalities on the coated surface were observed to evaluate weather resistance according to the following criteria.

A: Abnormalities were not observed.
B: Slight swelling was observed.
C: Significant swelling was observed.

Protection properties (acid resistance): 0.4 ml of 40% sulfuric acid was spotted on each film. After heating at 70° C. for 15 minutes, the film was washed with water and peeled off, and the presence or absence of swelling, dulling, and etching marks of the aminoalkyd coating film was observed to evaluate protection properties according to the following criteria.

S: Abnormalities were not observed.
A: Slight dulling was observed, but no swelling or etching was observed.
B: Swelling was observed.
C: Dulling or etching were observed.

Film strength and elongation: Measurement was performed using an Instron-type tensile tester (Autograph produced by Shimadzu Corporation) at 20° C. The tensile speed was 50 mm/min., and the load was 5 kgf.

Production of Aqueous Coating Composition
(Elastic Base Aqueous Coating Composition)

Examples 41 to 43 and Comparative Examples 7 and 8

The reactive group-containing resin (B5) dispersion obtained in Production Example 37 (solids concentration 55%), and optionally an aqueous dispersion of acrylic urethane composite resin particles (A) and the components shown in Table 6 (solids content) were blended and mixed by stirring to obtain elastic base aqueous coating compositions Nos. 1 to 5.

Each of the elastic base aqueous coating compositions obtained above was adjusted with water to have an adequate coating viscosity, individually applied to mortar plates with a mastic roller so that the coating composition was applied in an amount of about 1.0 kg/m$^2$, and then dried at 20° C. and 65% RH for one day. Subsequently, a top coating composition (a coating composition prepared by mixing 20 parts of ES-48 (produced by Colcoat Co., Ltd., a low condensate of ethyl silicate) and 5 parts of triethyl borate with 100 parts of Ales Retan (produced by Kansai Paint Co., Ltd., a hydroxy-containing acrylic isocyanate curing solvent-based top coating composition) (as resin solids) and stirring the mixture) was applied to each base coating film by air spray so that the coating composition was applied in an amount of about 0.2 kg/m² and dried at 20° C. and 65% RH for 7 days to obtain coating finished plates.

Table 6 shows the proportions of the components of each elastic base aqueous coating composition and the results of the performance tests conducted for the coating finished plates. Notes (*1) to (*5) in Table 6 and the test and evaluation methods are as given below.

TABLE 6

Proportions of the components of the coating composition and performance test results

|  | Example | | | Comparative Example | |
| --- | --- | --- | --- | --- | --- |
|  | 41 | 42 | 43 | 7 | 8 |
| Elastic base aqueous coating composition No. | 1 | 2 | 3 | 4 | 5 |
| Reactive group-containing resin (B5) dispersion | 160 | 160 | 160 | 160 | 200 |
| Dispersion of acrylic urethane composite resin particles No. 12 | 55 | 55 |  |  |  |
| Dispersion of acrylic urethane composite resin particles No. 7 |  |  | 55 |  |  |
| Dispersion of acrylic urethane composite resin particles No. 20 |  |  |  | 55 |  |
| Calcium carbonate | 363 | 363 | 363 | 363 | 363 |
| Hydroxyethyl cellulose (*1) | 25 | 25 | 25 | 25 | 25 |
| SN-defoamer A63 (*2) | 5 | 5 | 5 | 5 | 5 |
| Nopcosant K (*3) | 3.1 | 3.1 | 3.1 | 3.1 | 3.1 |
| Film formation auxiliary (*4) | 11 | 11 | 11 | 11 | 11 |
| Swasol 310 (*5) |  | 10 | 10 | 10 | 10 |
| Adipic acid dihydrazide |  | 0.25 | 0.25 | 0.25 | 0.25 |
| Elongation of elastic base film alone (%) | 150 | 140 | 130 | 135 | 105 |
| Finished appearance | S | A | A | C | A |
| Heating and cooling repeat test | A | A | A | A | B |

(*1) Hydroxyethyl cellulose: active ingredient: 2.5%, a thickener
(*2) SN-defoamer A63: produced by SAN NOPCO Limited, an antifoaming agent
(*3) Nopcosant K: produced by SAN NOPCO Limited, a dispersant
(*4) Film formation auxiliary: 2,2,4-trimethyl-1,3-pentanediol monoisobutyrate
(*5) Swasol 310: produced by Cosmo Oil Co., Ltd., a hydrocarbon-based solvent Elongation of elastic base film alone: Test pieces were prepared according to JIS A 6909. The elongation of each of the dried coating films alone was measured at a 20° C. atmosphere and a tensile speed of 200 mm/min. with an Autograph AG2000B tensile tester (Shimadzu Corporation).
Finished appearance: The finished appearance of the coating film surface of each of the test coated plates obtained above was visually evaluated according to the following criteria:
S: The finished surface was uniformly and evenly smooth, and the coating film had an extremely good appearance.
A: The surface was slightly poor in smoothness, but the coating film had a good appearance.
B: Unevenness in suction of the top coating composition was observed.
Heating and cooling repeat test: According to JIS A 6909, each coating finished plate used for the finishing quality test was immersed in water at 20° C. for 18 hours, immediately cooled in a thermostatic room at −20° C. for 3 hours, and then heated in a thermostatic room at 50° C. for 3 hours. This procedure for 24 hours was regarded as one cycle, and this cycle was repeated 20 times. Thereafter, the condition of the coated surface was visually evaluated according to the following criteria:
A: No peeling, blistering, or cracking was observed, and no discoloration or reduction in gloss was observed.
B: No peeling, blistering, or cracking was observed, but discoloration or reduction in gloss was slightly observed.
C: Peeling, blistering, or cracking was observed.

Production of Aqueous Coating Composition (Aqueous Coating Composition for Building Materials)

Examples 44 and 45 and Comparative Examples 9 and 10

The reactive group-containing resin (B6) dispersion obtained in Production Example 38 (solids concentration: 47.7%), a silicone compound (methyltrimethoxysilane condensate (weight average molecular weight: about 4,000)), a pigment paste (a pigment paste obtained by mixing 2 parts of BYK-190 (produced by BYK, trade name, a dispersing resin), 50 parts of deionized water, and 100 parts of titanium white and dispersing the mixture with a paint shaker (solids content 67%)), etc., and optionally an aqueous dispersion of acrylic urethane composite resin particles (A) were mixed by stirring in the amounts shown in Table 7. Thereafter, 0.1 parts of ammonia was added, and the mixtures were adjusted to a pH of about 8 to 9 to obtain aqueous coating compositions for building materials Nos. 1 to 4 having a solids content of 54%. The components of the compositions in Table 7 are shown in terms of solids content. The film formation auxiliary (*6) is the same as the film formation auxiliary (*4) shown in Table 6. The obtained aqueous coating compositions for building materials were subjected to the following performance tests.

Table 7 shows the proportions of the components of each aqueous coating composition for building materials and the results of the performance tests. The test and evaluation methods are as described below.

TABLE 7

Proportions of the components of the coating composition and performance test results

|  | Example | | Comparative Example | |
| --- | --- | --- | --- | --- |
|  | 44 | 45 | 9 | 10 |
| Aqueous coating composition for building materials No. | 1 | 2 | 3 | 4 |
| Reactive group-containing resin (B6) | 80 | 80 | 80 | 100 |
| Acrylic urethane composite resin particles No. 7 | 20 |  |  |  |
| Acrylic urethane composite resin particles No. 12 |  | 20 |  |  |
| Acrylic urethane composite resin particles No. 20 |  |  | 20 |  |
| Pigment paste | 74 | 74 | 74 | 74 |
| Silicone compound | 1 | 1 | 1 | 1 |

TABLE 7-continued

Proportions of the components of the coating composition and performance test results

|  | Example | | Comparative Example | |
|---|---|---|---|---|
|  | 44 | 45 | 9 | 10 |
| Film formation auxiliary (*6) | 10 | 10 | 10 | 10 |
| Weather resistance (gloss retention %) | 89 | 94 | 78 | 76 |
| Acid resistance (μm) | 0.3 | 0.2 | 0.3 | 0.6 |
| Water resistance | A | S | A | A |

Weather resistance: Each aqueous coating composition for building materials was individually applied to slate plates coated with a sealer to a film thickness of 30 μm when dried, and dried at 120° C. for 20 minutes to prepare test coated plates. The initial 60° specular gloss value of each test plate was measured.

Subsequently, an accelerated weather resistance test (rain cycle: 12 min./hour, black panel temperature: 60 to 66° C.) was performed using a Sunshine Weather-O-Meter (produced by Suga Test Instruments Co., Ltd.). The 60-degree specular gloss value after the test time (5,000 hours) was measured as the final gloss value and divided by the initial gloss value. The obtained value was regarded as gloss retention (%). The higher the gloss retention, the better the weather resistance of the coating film.

Acid resistance: 0.4 cc of 40% sulfuric acid was dropped onto the coating film of each test plate. The test plate was then heated for 15 minutes on a hot plate heated to 60° C. and washed with water. The etching depth (μm) of the portion at which the sulfuric acid had been dropped was measured using a surface roughness tester (Surfcom 570A; surface roughness measuring device; produced by Tokyo Seimitsu Co., Ltd.) with a cutoff of 0.8 mm (scanning rate of 0.3 mm/s, magnification of 5,000 times) to evaluate the acid resistance. The smaller the etching depth, the better the acid resistance.

Water resistance: Each test plate was allowed to stand in a thermostatic room at 20° C. for 24 hours, immersed in warm water of 80° C. for 5 hours, and then gradually cooled from 80° C. to room temperature while remaining immersed. The test plate was removed from the water, and the surface state of the test plate was evaluated according to the following criteria:

S: Extremely good; no dulling or clouding was observed.
A: Slight dulling was observed, but the surface state was good.
B: Dulling was observed, and the coating film was cloudy.

The invention claimed is:

1. An aqueous coating composition comprising acrylic urethane composite resin particles (A), a reactive group-containing resin (B), and optionally a crosslinking agent (C), the acrylic urethane composite resin particles (A) comprising an acrylic urethane resin (I) and a graft acrylic resin (II), and being acrylic urethane composite resin particles prepared by synthesizing the acrylic urethane resin (I) in the presence of the graft acrylic resin (II), the graft acrylic resin (II) being a hydrophobic-chain- and hydrophilic-chain-containing resin having a weight average molecular weight of 5,000 or more.

2. The aqueous coating composition according to claim 1, wherein the acrylic urethane resin (I) in the acrylic urethane composite resin particles (A) is an acrylic urethane graft resin (I-A).

3. The aqueous coating composition according to claim 1, wherein the acrylic resin of the acrylic urethane resin (I) in the acrylic urethane composite resin particles (A) comprises a polymerizable unsaturated monomer having active hydrogen atom(s) reactive with an isocyanate group and other polymerizable unsaturated monomer(s) as constituent monomer components.

4. The aqueous coating composition according to claim 1, wherein the reactive group of the reactive group-containing resin (B) is at least one member selected from the group consisting of hydroxy, acid group, carbonyl, N-methylol alkyl ether group, isocyanate, epoxy, amino, alkoxysilyl, carbodiimide group, and hydrazide group.

5. An article coated with the aqueous coating composition according to claim 1.

6. A method for forming a coating film, the method comprising applying the aqueous coating composition according to claim 1.

7. A method for producing an aqueous coating composition comprising acrylic urethane composite resin particles (A), a reactive group-containing resin (B), and optionally a crosslinking agent (C), the method comprising the following step;
producing the acrylic urethane composite resin particles, the acrylic urethane composite resin particles comprising an acrylic urethane resin (I) and a graft acrylic resin (II),
the acrylic urethane resin (I) being synthesized in an aqueous medium in the presence of the graft acrylic resin (II), the graft acrylic resin (II) being a hydrophobic-chain-and hydrophilic-chain-containing resin having a weight average molecular weight of 5,000 or more.

* * * * *